(12) United States Patent
Schultz et al.

(10) Patent No.: US 8,083,154 B2
(45) Date of Patent: Dec. 27, 2011

(54) CONTROLLER SYSTEM USER INTERFACE

(75) Inventors: David A. Schultz, Savage, MN (US);
Patrick C. Tessier, Oakdale, MN (US);
Cary Leen, Hammond, WI (US)

(73) Assignee: Honeywell International Inc.,
Morristown, NJ (US)

( * ) Notice: Subject to any disclaimer, the term of this patent is extended or adjusted under 35 U.S.C. 154(b) by 70 days.

(21) Appl. No.: 12/511,225

(22) Filed: Jul. 29, 2009

(65) Prior Publication Data
US 2009/0282357 A1 Nov. 12, 2009

Related U.S. Application Data

(63) Continuation of application No. 10/907,433, filed on Mar. 31, 2005, now Pat. No. 7,584,897.

(51) Int. Cl.
*G05D 23/00* (2006.01)
(52) U.S. Cl. .......................... 236/94; 700/278
(58) Field of Classification Search ................. 236/1 C, 236/94; 700/276, 278
See application file for complete search history.

(56) References Cited

U.S. PATENT DOCUMENTS

| | | | |
|---|---|---|---|
| 4,079,366 A | 3/1978 | Wong | |
| 4,174,807 A | 11/1979 | Smith et al. | |
| 4,206,872 A | 6/1980 | Levine | |
| 4,224,615 A | 9/1980 | Penz | |
| 4,264,034 A | 4/1981 | Hyltin et al. | |
| 4,296,334 A | 10/1981 | Wong | |
| 4,298,946 A | 11/1981 | Hartsell et al. | |
| 4,308,991 A | 1/1982 | Peinetti et al. | |
| 4,332,352 A | 6/1982 | Jaeger | |
| 4,337,822 A | 7/1982 | Hyltin et al. | |
| 4,337,893 A | 7/1982 | Flanders et al. | |
| 4,373,664 A | 2/1983 | Barker et al. | |
| 4,379,483 A | 4/1983 | Farley | |

(Continued)

FOREIGN PATENT DOCUMENTS

DE 33341176 4/1985

(Continued)

OTHER PUBLICATIONS

"A Full Range of Alternative User Interfaces For Building Occupants and Operators," http://www.automatedbuildings.com/news/jan00/articles/andover/andover.htm, 5 pages, dated Jan. 2000, printed Sep. 20, 2004.

(Continued)

*Primary Examiner* — Marc Norman
(74) *Attorney, Agent, or Firm* — Seager, Tufte & Wickhem LLC

(57) ABSTRACT

A thermostat system having dedicated informational regions in a display and associated buttons or softkeys for sequential operation. The system may maximize utilization of a sectioned display and buttons for system navigation. The informational, selection and/or action design takes into consideration operational button groupings for straightforward comfort settings as well as editing of the clock, day-of-week, schedules, and so forth. Sections, regions or areas of the display may indicate immediate button operations. The changeable information in the regions associated with the softkeys or buttons may provide sequential operation of the thermostat system. The system may have multiple schedules and setpoints for heating and cooling comfort setting flexibility. A combining of individual schedules may be automatically selected. Also, there may be a system switch mode, for example, between heat and cool, where the schedules may be individually edited. Scheduling may be informational and/or action item and option key driven.

17 Claims, 22 Drawing Sheets

U.S. PATENT DOCUMENTS

| | | | |
|---|---|---|---|
| 4,382,544 A | 5/1983 | Stewart |
| 4,386,649 A | 6/1983 | Hines et al. |
| 4,388,692 A | 6/1983 | Jones et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,506,827 A | 3/1985 | Jamieson et al. |
| 4,556,169 A | 12/1985 | Zervos |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,717,333 A | 1/1988 | Carignan |
| 4,725,001 A | 2/1988 | Carney et al. |
| 4,783,800 A | 11/1988 | Levine |
| 4,819,714 A | 4/1989 | Otsuka et al. |
| 4,837,731 A | 6/1989 | Levine et al. |
| 4,881,686 A | 11/1989 | Mehta |
| 4,918,439 A | 4/1990 | Wozniak et al. |
| 4,948,040 A | 8/1990 | Kobayashi et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Dick et al. |
| 5,038,851 A | 8/1991 | Mehta |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,329,991 A | 7/1994 | Metha et al. |
| 5,348,078 A | 9/1994 | Dushane et al. |
| 5,386,577 A | 1/1995 | Zenda |
| 5,404,934 A | 4/1995 | Carlson et al. |
| 5,412,377 A | 5/1995 | Evans et al. |
| 5,454,510 A | 10/1995 | Manson et al. |
| 5,461,558 A | 10/1995 | Patsiokas et al. |
| 5,482,209 A | 1/1996 | Cochran et al. |
| 5,526,422 A | 6/1996 | Keen |
| 5,537,106 A | 7/1996 | Mitcuhashi |
| 5,566,879 A | 10/1996 | Longtin |
| 5,570,837 A | 11/1996 | Brown et al. |
| 5,590,831 A | 1/1997 | Manson et al. |
| 5,673,850 A | 10/1997 | Uptegraph |
| 5,682,206 A | 10/1997 | Wehmeyer et al. |
| 5,732,691 A | 3/1998 | Maiello et al. |
| 5,782,296 A | 7/1998 | Metha |
| 5,818,428 A | 10/1998 | Eisenbrandt et al. |
| 5,873,519 A | 2/1999 | Beilfuss |
| 5,886,697 A | 3/1999 | Naughton et al. |
| 5,901,183 A | 5/1999 | D'Souza |
| 5,902,183 A | 5/1999 | D'Souza |
| 5,915,473 A | 6/1999 | Ganesh et al. |
| 5,937,942 A | 8/1999 | Bias et al. |
| 5,947,372 A | 9/1999 | Tiernan |
| 5,950,709 A | 9/1999 | Krueger et al. |
| 5,983,146 A | 11/1999 | Sarbach |
| 6,020,881 A | 2/2000 | Naughton et al. |
| 6,032,867 A | 3/2000 | Dushane et al. |
| 6,059,195 A | 5/2000 | Adams et al. |
| 6,081,197 A | 6/2000 | Garrick et al. |
| 6,101,824 A | 8/2000 | Meyer et al. |
| 6,104,963 A | 8/2000 | Cebasek et al. |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,192,282 B1 | 2/2001 | Smith et al. |
| 6,196,467 B1 | 3/2001 | Dushane et al. |
| 6,208,331 B1 | 3/2001 | Singh et al. |
| 6,213,404 B1 | 4/2001 | Dushane |
| 6,216,956 B1 | 4/2001 | Ehlers et al. |
| 6,236,326 B1 | 5/2001 | Murphy |
| 6,285,912 B1 | 9/2001 | Ellison et al. |
| 6,290,140 B1 | 9/2001 | Pesko et al. |
| 6,315,211 B1 | 11/2001 | Sartain et al. |
| 6,318,639 B1 | 11/2001 | Toth |
| 6,323,882 B1 | 11/2001 | Jerome et al. |
| 6,330,806 B1 | 12/2001 | Beaverson et al. |
| 6,344,861 B1 | 2/2002 | Naughton et al. |
| 6,351,693 B1 | 2/2002 | Monie et al. |
| 6,398,118 B1 | 6/2002 | Rosen et al. |
| 6,453,687 B2 | 9/2002 | Sharood et al. |
| 6,466,132 B1 | 10/2002 | Caronna et al. |
| 6,478,233 B1 | 11/2002 | Shah |
| 6,502,758 B2 | 1/2003 | Cottrell |
| 6,518,953 B1 | 2/2003 | Armstrong |
| 6,518,957 B1 | 2/2003 | Lehtinen et al. |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |
| 6,608,560 B2 | 8/2003 | Abrams |
| 6,619,555 B2 | 9/2003 | Rosen |
| 6,621,507 B1 | 9/2003 | Shah |
| 6,663,010 B2 | 12/2003 | Chene et al. |
| 6,685,098 B2 | 2/2004 | Okano et al. |
| 6,726,112 B1 | 4/2004 | Ho |
| 6,783,079 B2 | 8/2004 | Carey et al. |
| 6,786,421 B2 | 9/2004 | Rosen |
| 6,789,739 B2 | 9/2004 | Rosen |
| 6,801,849 B2 | 10/2004 | Szukala et al. |
| 6,824,069 B2 | 11/2004 | Rosen |
| 6,833,990 B2 | 12/2004 | LaCroix et al. |
| 6,842,721 B2 | 1/2005 | Kim et al. |
| 6,851,621 B1 | 2/2005 | Wacker et al. |
| 6,868,293 B1 | 3/2005 | Schurr et al. |
| 6,997,390 B2 | 2/2006 | Alles |
| 7,001,495 B2 | 2/2006 | Essalik et al. |
| 7,050,026 B1 | 5/2006 | Rosen |
| 7,089,066 B2 | 8/2006 | Hesse et al. |
| 7,114,554 B2 * | 10/2006 | Bergman et al. ............... 165/238 |
| 7,152,806 B1 | 12/2006 | Rosen |
| 7,156,318 B1 | 1/2007 | Rosen |
| 7,240,289 B2 | 7/2007 | Naughton et al. |
| 7,274,972 B2 | 9/2007 | Amundson et al. |
| 7,302,642 B2 | 11/2007 | Smith et al. |
| 7,505,914 B2 | 3/2009 | McCall |
| 7,542,867 B2 | 6/2009 | Steger et al. |
| 7,641,126 B2 * | 1/2010 | Schultz et al. .................. 236/94 |
| 2001/0029585 A1 | 10/2001 | Simon et al. |
| 2001/0052459 A1 | 12/2001 | Essalik et al. |
| 2002/0011923 A1 | 1/2002 | Cunningham et al. |
| 2002/0022991 A1 | 2/2002 | Sharood et al. |
| 2002/0092779 A1 | 7/2002 | Essalik et al. |
| 2002/0173929 A1 | 11/2002 | Seigel |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2004/0262410 A1 | 12/2004 | Hull |
| 2005/0088315 A1 | 4/2005 | Klein et al. |
| 2005/0108091 A1 | 5/2005 | Sotak et al. |
| 2006/0192021 A1 | 8/2006 | Schultz et al. |
| 2006/0208099 A1 * | 9/2006 | Chapman et al. ............... 236/51 |
| 2006/0219799 A1 | 10/2006 | Schultz et al. |

FOREIGN PATENT DOCUMENTS

| | | |
|---|---|---|
| EP | 0070414 | 1/1983 |
| EP | 0678204 | 1/2000 |
| EP | 0985994 | 3/2000 |
| EP | 1033641 | 9/2000 |

| | | |
|---|---|---|
| EP | 1074009 | 7/2001 |
| FR | 2711230 | 4/1995 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |

OTHER PUBLICATIONS

"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"HTI News Release," http://www.hometoys.com/htinews/apr99/releases/ha101.htm, 3 pages, printed Apr. 1999.
"Mark of Excellence Award Finalist Announced," http://64.233.167.104/search?Q=cache:ciOA2YtYaBIJ:www.hometoys.com/releases/mar . . . , 6 pages, Leopard Touchscreen on page 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"Spotlight on integrated systems," Custom Builder, V8, N2, p. 66(6), Mar.-Apr. 1993.
"Vantage Expands Controls For Audio/Video, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
Aprilaire Electronic Thermostats Models 8344, 8346, 8348, 8363, 8365, 8366 Operating Instructions, 8 pages, prior to filing date of present application.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, prior to filing date of present application.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to filing date of present application.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," pp. 188-189, 2002.
Domotique Secant Home Automation—Web Page, available at http://www.secant.ca/En/Company/Default.asp, 1 page, at printed Sep. 28, 2004.
Firex Smoke Alarm, Ionization Models AD, ADC Photoelectric Model Pad, 4 pages, prior to filing date of present application.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System For Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents," 53 pages, printed Sep. 20, 2004.
http://www.ritetemp.info/rtMenu_13.html, Rite Temp 8082, 8 pages , printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.

http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004
Hunter, "44200/44250," Owner's Manual, 32 pages, printed prior to filing date.
Hunter, "44300/44350," Owner's Manual, 35 pages, printed prior to filing date.
Hunter, "Auto Saver 550", Owner's Manual Model 44550, 44 pages, printed prior to filing date.
Invensys User's Manual, 21 pages, prior to filing date of present application.
Invensys™, "9700i 9701i 9715i 9720i Deluxe Programmable Thermostats," User's Manual, pp. 1-28, printed prior to filing date.
Lux ELV1 Programmable Line Voltage Thermostat, Installation Instructions, 3 pages, prior to filing date of present application.
Lux TX500 Series Smart Temp Electronic Thermostat, 3 pages, prior to filing date of present application.
Lux TX9000 Installation, 3 pages, prior to filing date of present application.
Lux, "511 Series Smart Temp Electronic Thermostat," Owner's Manual, 3 pages, printed prior to filing date.
Lux, "600 Series Smart Temp Electronic Thermostat," Owner's Manual, 3 pages, printed prior to filing date.
Lux, "602 Series Multi-Stage Programmable Thermostat," Owner's Manual, 2 pages, printed prior to filing date.
Lux, "605/2110 Series Programmable Heat Pump Thermostat," Owner's Manual, 3 pages, printed prior to filing date.
Lux, "700/9000 Series Smart Temp Electronic Thermostat," Owner's Manual, 3 pages, printed prior to filing date.
Lux, "PSPH521 Series Programmable Heat Pump Thermostat," Owner's Manual, 3 pages, printed prior to filing date.
Lux, "TX1500 Series Smart Temp Electronic Thermostat," Owner's Manual, 6 pages, printed prior to filing date.
Metasys, "HVAC PRO for Windows User's Manual," 308 pages, 1998.
Proliphix, Inc., "NTI0e & NT20e," Proliphix, Inc., 54 pages, prior to filing date of current application.
Ritetemp Operation 8029, 3 pages, Jun. 19, 2002.
Ritetemp Operation 8050, 5 pages, Jun. 26, 2002.
Ritetemp Operation 8085, pp. 1-6, prior to filing date of present application.
Sealed Unit Parts Co., Inc., Supco & CTC Thermostats . . . loaded with features, designed for value!, 6 pages, prior to filing date of present application.
Totaline Model P474-1035 Owner's Manual Programmable 5-2 Day Digital Thermostat, pp. 1-21, prior to filing date of present application.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to filing date of present application.
Totaline, "1 For All programmable Digital Thermostat," Owner's Manual P/N P374-1100FM, 23 pages, Nov. 1998.
Totaline, "1 For All Programmable Digital Thermostat," Owner's Manual P/N P474-1050, 21 pages, Nov. 1998.
Totaline, "1 For All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Visor Handheld User Guide, Copyright 1999-2000.
WarmlyYours, "Model TH111GFCI-P (120 VAC)," Manual, pp. 1-4, printed prior to filing date.
White-Rodgers 1F80-224 Programmable Electronic Digital Thermostat, Installation and Operation Instructions, 8 pages, prior to filing date of present application.
White-Rodgers Comfort-Set III Thermostat, pp. 1-44, prior to filing date of present application.
White-Rodgers Installation Instructions for Heating & Air Conditioning IF78 Non-Programmable Thermostat, 6 pages, prior to filed of present application.
White-Rodgers Installation Instructions for Heating & Air Conditioning IF78 5/2 Day Programmable Thermostat, 7 pages, prior to filing date of present application.
White-Rodgers, "Installation Instructions for Heating & Air Conditioning IF72 5/2 Day Programmable Heat Pump Thermostat," 8 pages, printed prior to filing date.
White-Rodgers, "Comfort-Set 90 Series Thermostat," Manual, pp. 1-24, printed prior to filing date.
White-Rodgers, 1F80-240 "(for Heating Only systems) Programmable Electronic Digital Thermostat," Installation and Operation Instructions, 8 pages, printed prior to filed.
White-Rodgers, 1F80-241 "Programmable Electronic Digital Thermostat," Installation and Operation Instructions, 6 pages, printed prior to filing date.
White-Rodgers, 1F80-261 "Programmable Electronic Digital Thermostat," Installation and Operation Instructions, 8 pages, printed prior to filing date.
White-Rodgers, 1F81-261 "Programmable Electronic Digital Multi-Stage Thermostat," Installation and Operation Instructions, 8 pages, printed prior to filing date.
White-Rodgers, 1F82-261 "Programmable Electronic Digital Heat Pump Thermostat," Installation and Operation Instructions, 8 pages, printed prior to filing date.
White-Rodgers, Comfort-Set 90 Series Premium, 4 pages, prior to filing date of present application.
www.icmcontrols.com, Simplecomfort, SC3000 Single Stage Heat/Single Stage Cool or Single Stage Heat Pump/Manual Changeover, 1 page, printed prior to filing date.
www.icmcontrols.com, Simplecomfort, SC3001 Single Stage Heat/Single Stage Cool or Single Stage Heat Pump/Manual Changeover, 1 page, printed prior to filing date.
www.icmcontrols.com, Simplecomfort, SC3006 Single Stage Heat/Single Stage Cool or Single Stage Heat Pump/Manual Changeover, 1 page, printed prior to filing date.
www.icmcontrols.com, Simplecomfort, SC3201 2 Stage Heat Pump Manual Changover, 1 page, printed prior to filing date.
www.icmcontrols.com, Simplecomfort, SC3801 2 Stage Heat/2 Stage Cool 2 Stage Heat Pump/Audio Changeover, 1 page, printed prior to filing date.
Honeywell, S7340A System User Interface, 1 page, 1999.
Honeywell, T7525/T7526 Thermostat Touchpad, User Guide, pp. 1-13, 1995.
Honeywell, TotalHome Energy Management System 2000, pp. 1-12, 1995.
Honeywell, TotalHome Energy Management System 2000, 2 pp, 1996.
Blister Pack Insert from a Ritetemp 8082 Touch Screen Thermostat Product, 2 pages, 2002.
Operation Manual for Ritetemp Touch Screen Thermostat 8082, 8 pages, 2002.
Trouble Shooting Guide for Ritetemp Thermostat 8082, 1 page, 2002.
Quick Start Guide for Ritetemp Thermostat 8082, 1 page, 2002.
Install Guide for Ritetemp Thermostat 8082, 6 pages, 2002.
Remote Control Power Requirement for Ritetemp Thermostat 8082, 1 page, 2002.
Mounting Template for Ritetemp Thermostat 8082, 1 page, 2002.

* cited by examiner

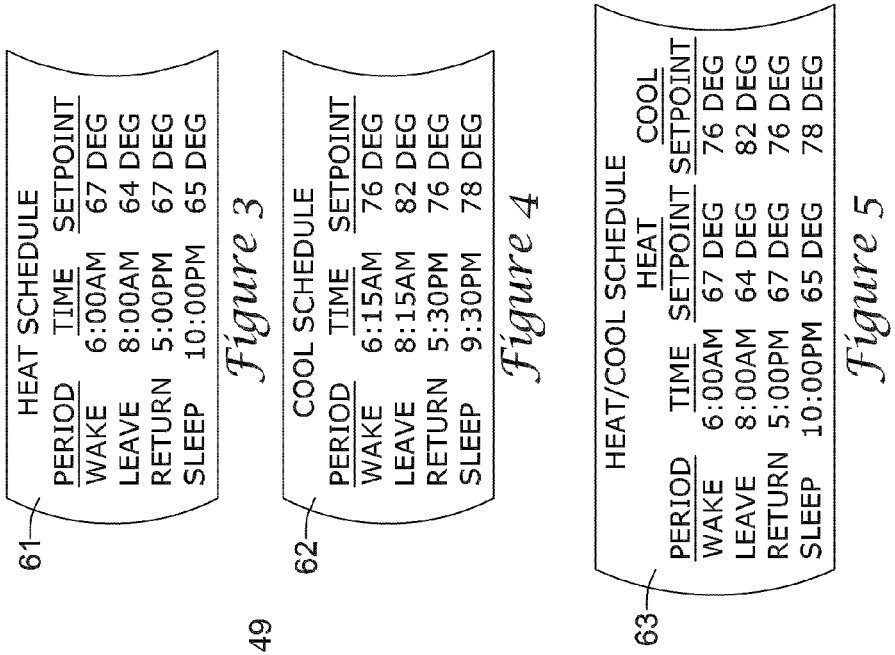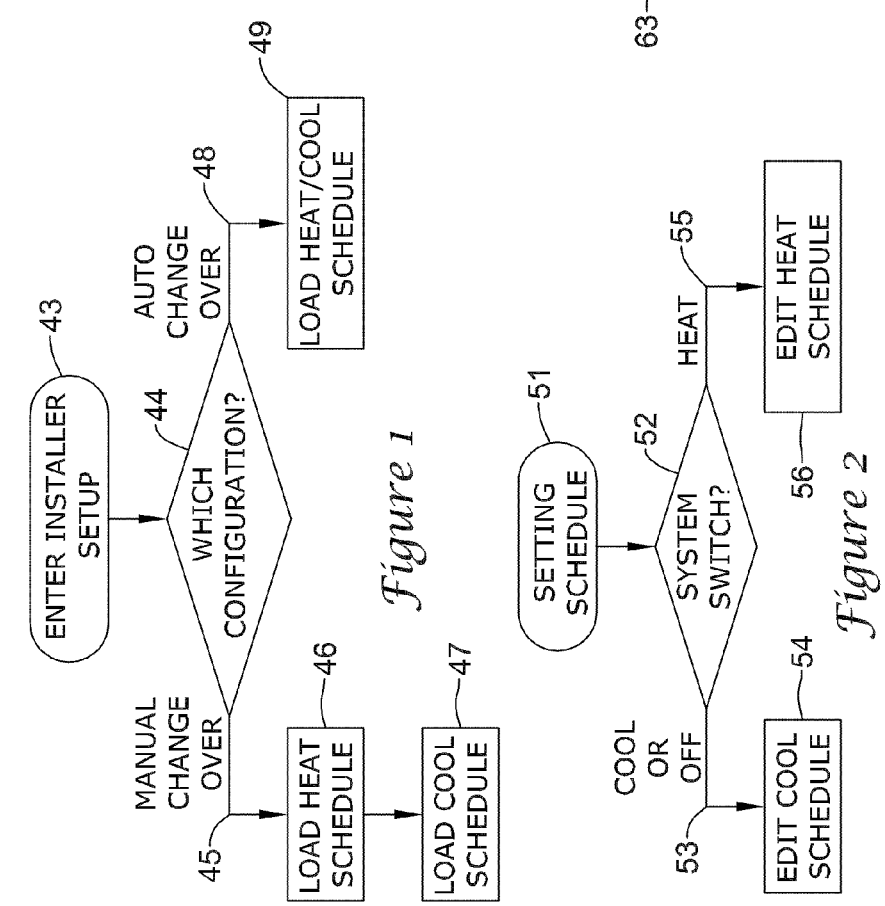

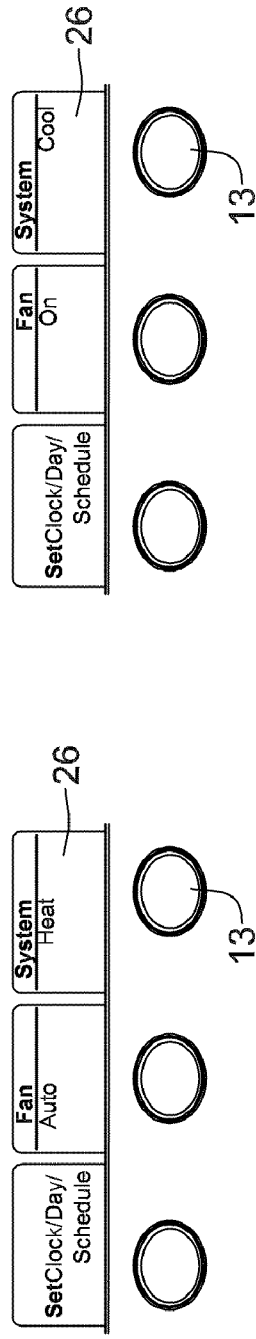
Figure 12
Figure 13
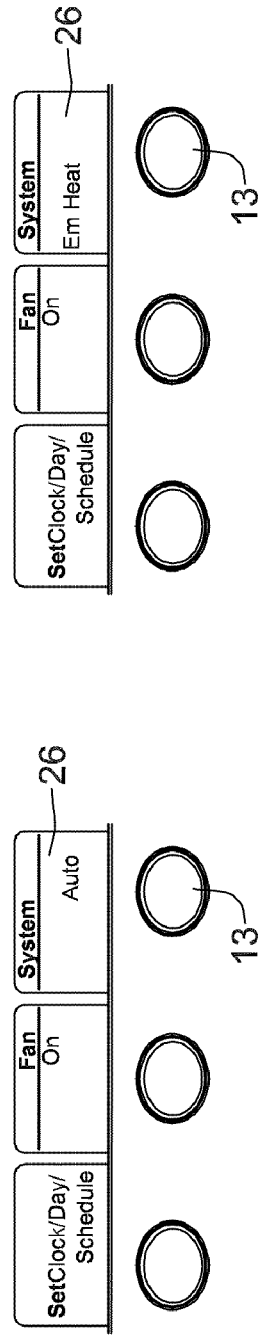
Figure 14
Figure 15

CONTROLLER SYSTEM USER INTERFACE

This Application is a continuation of co-pending U.S. patent application Ser. No. 10/907,433, filed Mar. 31, 2005, and entitled "CONTROLLER SYSTEM USER INTERFACE".

BACKGROUND

The present invention pertains to controllers and particularly to such involving thermostats. More particularly, it pertains to user interfaces for programmable devices.

SUMMARY

The invention is a thermostat system that may have informational regions, portions, sections, areas, labels, or segments in a display and associated buttons or softkeys for sequential operation to ease navigating operations of the system. Some examples of operation may involve set and schedule information.

BRIEF DESCRIPTION OF THE DRAWING

FIG. 1 shows a flow diagram of the changeover and auto changeover selection;

FIG. 2 shows a flow diagram of a setting schedule;

FIGS. 3-5 show example schedules;

FIGS. 12-16 show various system selections;

DESCRIPTION

Figure 6:
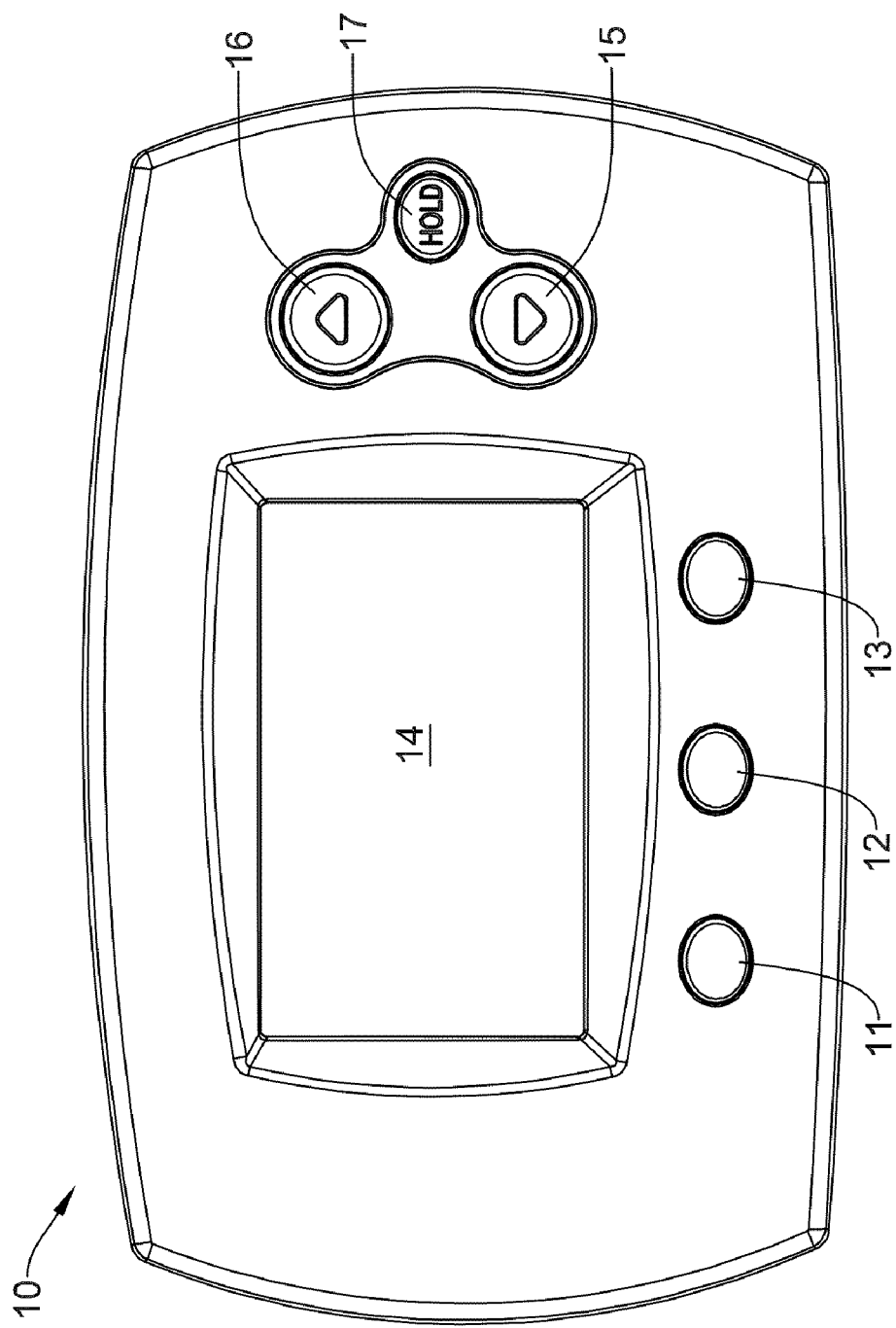
FIG. 6 shows an example of the present thermostat.

The present invention maximizes utilization of a divided, regionalized, labeled, proportional, sectioned or segmented display, and buttons to achieve ease-of-use thermostat system minimal or one-level navigation. The design takes into consideration operational button groupings for simple, straightforward comfort settings as well as editing of the clock, day-of-week, schedules, and so forth. Dedicated regions, portions, areas, labels, sections, or segments of the display may represent immediate button operations with given information and selections. With utilization of appropriate softkey descriptions and location, the system's user interface offers very simple, easy to navigate operation. The versatile, flexible and changeable information and/or selections in the sections or segments associated with the softkeys or buttons offer sequential operation to simplify usage of the thermostat system. Operational sequences have well thought-out softkey names, sequences, descriptions and locations which also support an easily navigable operation of the thermostat system.

The thermostat system may have an automatic schedule/program selector. The selector may be at least a portion of thermostat control system used for controlling heating, ventilating and air conditioning (HVAC) equipment. In the present description, "ventilating" means moving air within the system's temperature controlled spaces, not bringing in fresh air from the outside and putting out stale air. Since some may regard the terms "schedule" and "program" as somewhat synonymous and interchangeable, the term "schedule" may be used in the present description. The thermostat described here is an illustrative example of the invention. The thermostat may provide a user with different schedules for heat and cool modes. An appropriate schedule may be automatically selected based on a system configuration (i.e., a manual changeover (MCO) or an automatic changeover (ACO)) and a system switch mode (i.e., heat or cool).

A default configuration may include the MCO and the heat mode. With this configuration, two or more schedules may be utilized. The latter may be seen by going into a "Set Schedule" selection and sequencing through the schedule. In this mode, the heat times and setpoints may be adjusted and/or viewed. To adjust and/or view the cool schedule, the user should first set the system to "Cool" (or "Off"), and then enter the "Set Schedule" selection. The schedule sequence may allow the user to adjust and/or view the cooling times and setpoints.

FIG. 1 shows a flow diagram of the two schedule manual changeover and auto changeover selection. First, an installer setup 43 may be entered, upon which a configuration decision 44 is to be made. The manual changeover 45 may be selected and lead to a load 46 heat schedule and load 47 cool schedule. Or, the auto changeover 48 may be selected and lead to a load 46 heat/cool schedule. FIG. 2 shows a flow diagram of the setting schedule 51 which may lead to a system switch decision. Selecting a "cool or off" 53 may lead to an edit 54 cool schedule. Selecting a "heat" 55 may lead to an edit 56 heat schedule.

FIGS. 3, 4 and 5 reveal illustrative instances of a heat schedule 61, a cool schedule 62, and a heat/cool schedule 63. There may be additional schedules. Each schedule may have its own multiplicity of periods. For an illustrative instance, the heat schedule 61 in FIG. 3 shows periods Wake, Leave, Return and Sleep, with their start times and heat temperature set points. Another schedule 62 in FIG. 4 shows those four periods with their start times and cool temperature set points. The start times for the cool schedule 62 may be different than those for the heat schedule 61. Schedules 61 and 62 are for the manual changeover 45. As shown in FIG. 5, the schedules 61 and 62 may be combined into schedule 63 for the auto changeover 48. When schedules 61 and 62 are combined into the schedule 63, the start times of the heat schedule 61 for the four listed periods may prevail over the start times of schedule 62. The heat/cool schedule 63 may be used when the system 10 is configured for auto changeover. The heat schedule 61 may be used when system 10 is configured for manual changeover, or for heat only. The cool schedule 62 may be used when the system 10 is configured for manual changeover, or for cool only.

Figure 7:
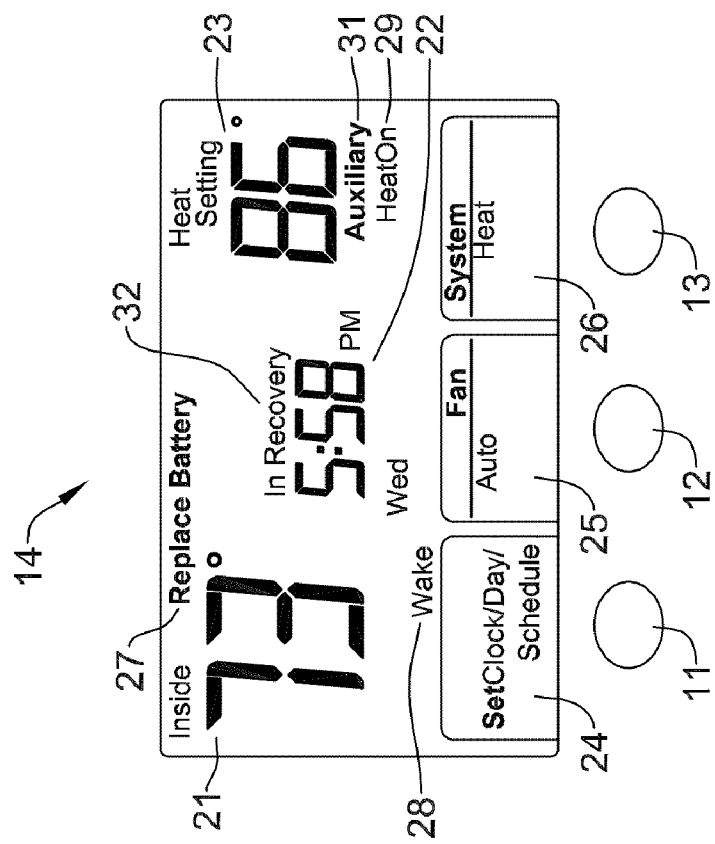
FIG. 7 reveals a screen of the thermostat.

FIGS. 6 and 7 show a thermostat 10 and its screen 14 which may utilize the present invention. Thermostat 10 may have separately programmable weekday/weekend schedules, one-touch temperature control to override a program schedule at any time, and an easy to read display at day or night time, which displays both ambient temperature and a temperature setting. These items and other items may be programmed in thermostat 10 with the thermostat disconnected from a heating and/or cooling system that the thermostat may be intended to control. Disconnecting the thermostat 10 from the heating and cooling system may involve merely unplugging the thermostat from, for example, a wall socket which is connected to the system. In other words, a user may program, modify or adjust items of the thermostat 10 while sitting in an armchair.

Thermostat 10 may have a screen 14 using LCD or other display technology, as in FIG. 7. There may be three function buttons or softkeys 11, 12 and 13, which may be pressed to select a function labeled or indicated in a dedicated region, portion, area, label, section, or segment of the display 14 just above each button, respectively. "Segment" may have more than one meaning. One is a segment of a display which may display information proximate to a key such as a softkey. Another meaning may refer to an element (e.g., a bar-like element) of an LCD presentation of a numeral for indicating such an item as, for example, time or temperature, rather than dots or elements of, for instance, a dot matrix display. The functions shown above each button may change depending on the task. An up (increase) button 16 and a down (decrease) button 15 (sometimes with appropriate arrow indications on the buttons) may be situated near the of display screen 14 on a face of the thermostat 10. These buttons 15 and 16 may be used to adjust time and temperature setpoints, and other parameters. Proximate to buttons 15 and 16 may be a hold button 17 for overriding programmed temperature control.

FIG. 7 shows various components of the display screen 14. Item 21 indicates the present inside temperature, item 22 shows the current time and day, item 23 shows a temperature setting or setpoint, and item 24 shows a function selection proximate to button 11. Item 25 shows the fan settings proximate to button 12, and item 26 shows a system setting function selection area proximate to button 13. Also, on display 14 is a low battery warning ("Replace Battery") indicator 27, a current program period indicator 28, a system status indicator 29, an auxiliary heat indicator 31, and an "In Recovery" indicator 32.

Figure 8:
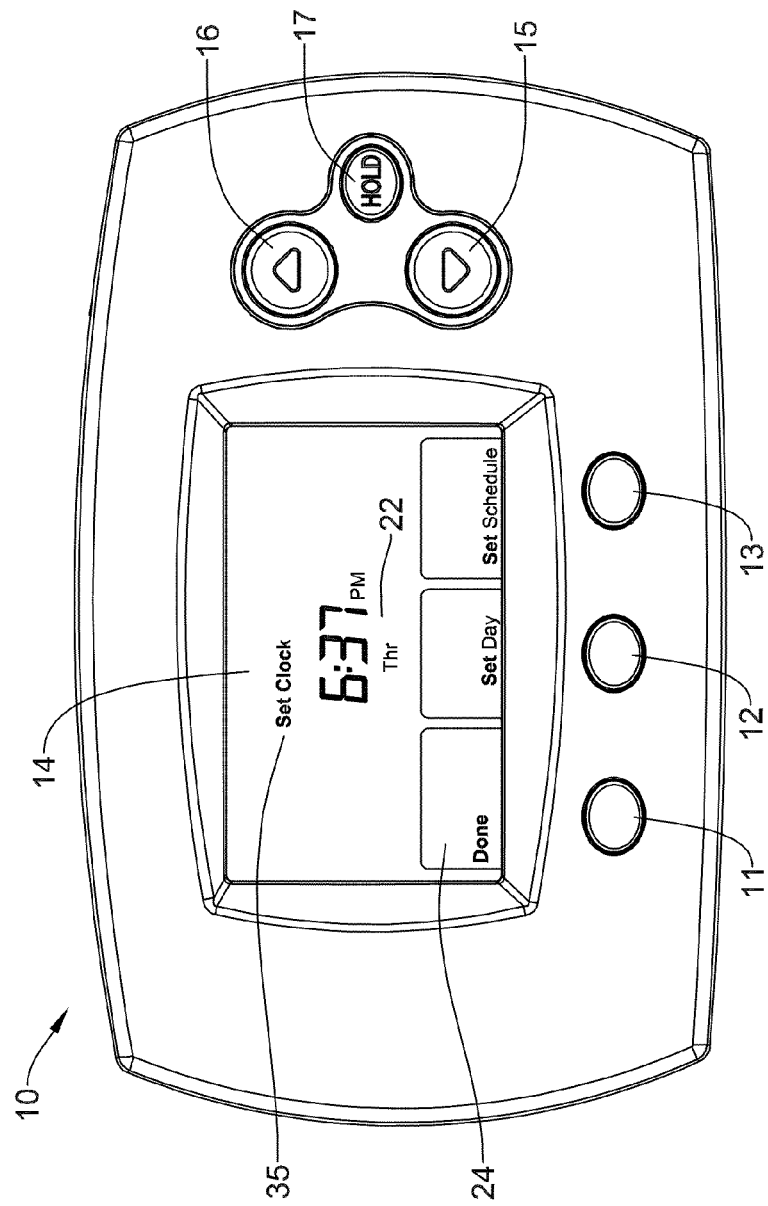
FIG. 8 shows a set clock mode.
Figure 9:
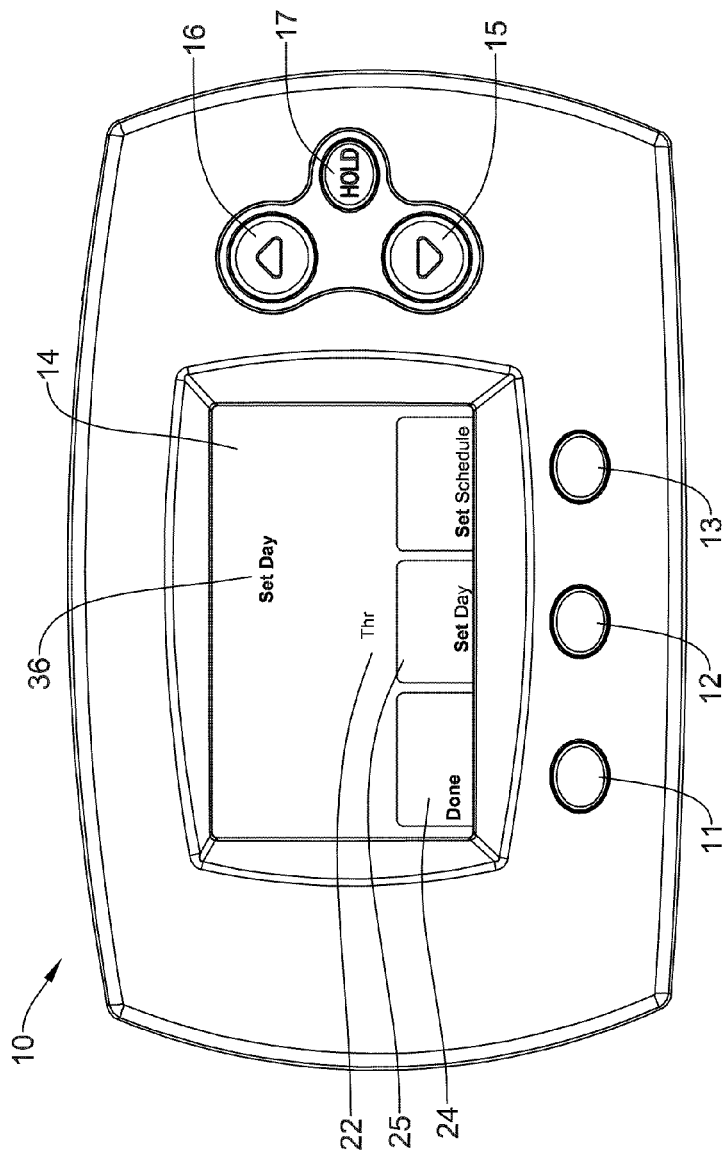
FIG. 9 shows a set day mode.

To set the time and day for thermostat 10, the button 11 situated below area 21 which says "Set Clock/Day/Schedule" may be pressed. Then a "Set Clock" logo 35 may flash on and off near the center of screen 14 and next to the time and day display 22, as shown in FIG. 8. One may press button 15 or 16 to set the clock time. After the clock is set or is determined to already show the time as desired, then the button 12 under area 25 that says "Set Day", may be pressed which will result in a "Set Day" logo 36 that flashes on and off, as shown in FIG. 9. The button 15 or 16 may be pressed for selecting the day of the week. Then one may press button 11 under area 24, which says "Done", to save and exit the time and day option. There may additionally be a date indicator (not shown) which could be set.

Figure 11:
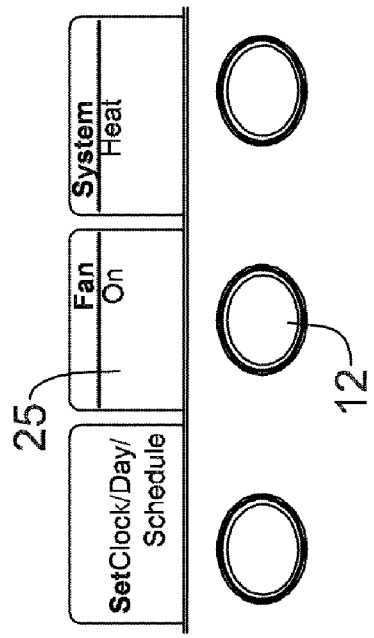
FIGS. 10 and 11 show fan mode selections.
Figure 10:
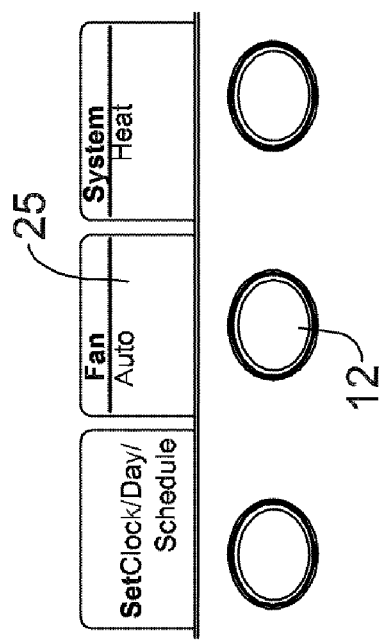

The fan setting may be selected. Button 12 under the "Fan" setting area 25 may be pressed to select "Auto" or "On" for fan operation, as shown in FIGS. 10 and 11. In the "Auto" mode, the fan may run only when the heating or cooling system is on. If set to "On", the fan may run continuously. The "On" setting may be used for improved air circulation, or for more efficient air cleaning. Area 25 in some versions of thermostat 10 may also have various fan or air mover speed settings.

Figure 16:
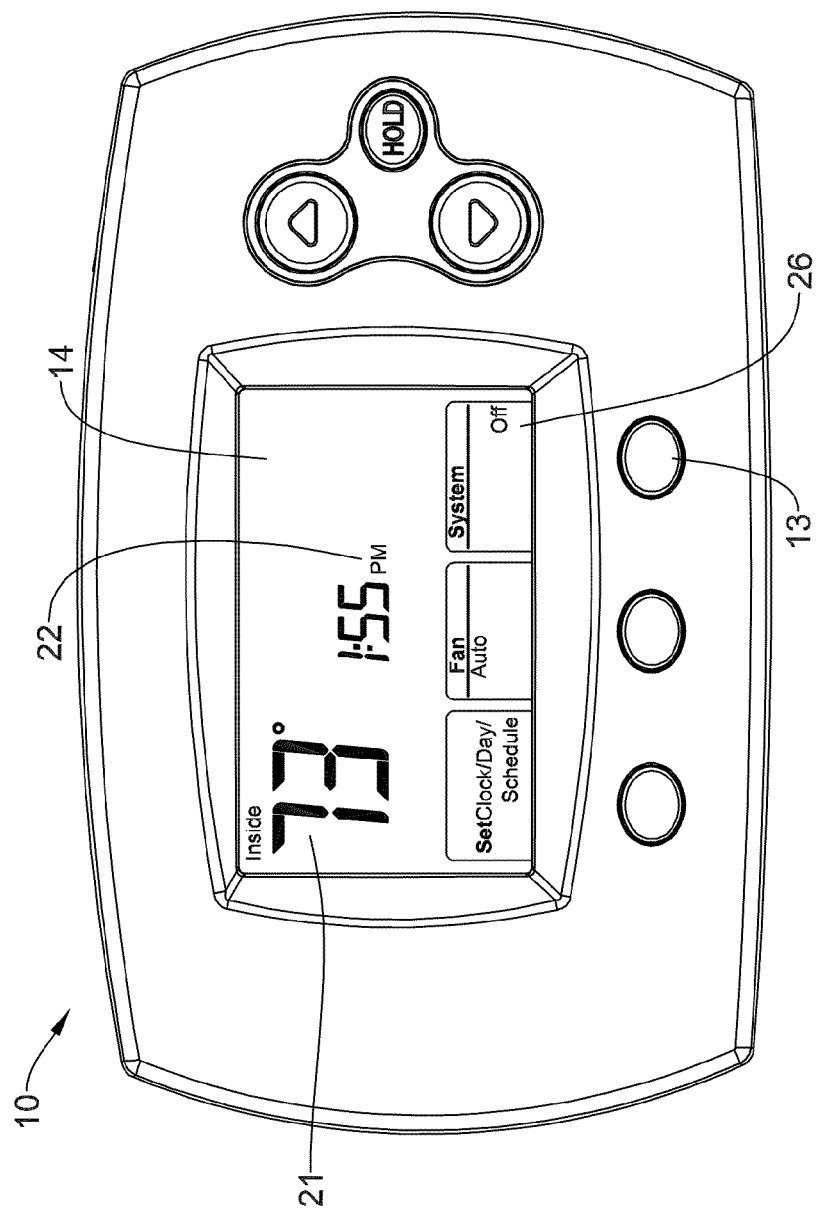

A system setting may be indicated in a selected area, region, section, segment, label or portion 26 of the display. The button 13 may be pressed to select "Heat" and get the heating system, as shown in FIG. 12. With this selection, the thermostat 10 may control just the heating system. Button 13 may be pressed to select "Cool" and get the heating system, as shown in FIG. 13. With this selection, the thermostat 10 may control just the cooling system. Button 13 may be pressed to select "Off." Here, both heating and cooling systems may be off. In some cases, one may get selections "Auto" or "Em Heat", as shown in FIGS. 14 and 15, respectively. These system settings might not appear on the thermostat 10 as their appearance could depend on how the thermostat is installed. With the selection "Auto", the thermostat may automatically select the heating or cooling system depending on the indoor temperature 21 and the single schedule setpoint setting. The "Em Heat" selection may be for only heat pumps with auxiliary heat. Here, the thermostat 10 may control emergency and auxiliary heat, and lock out the compressor. There may be additional system settings or selections in area, region, section, segment, label or portion 26. One may refer to region, though other terms may be used. FIG. 16 of thermostat 10 shows "Off" selected in system region 26. Here, screen 14 might reveal only the inside temperature 21, the time 22, and the three regions 24, 25 and 26, dedicated to softkeys 11, 12 and 13, respectively, at the bottom of the screen.

Figure 17:
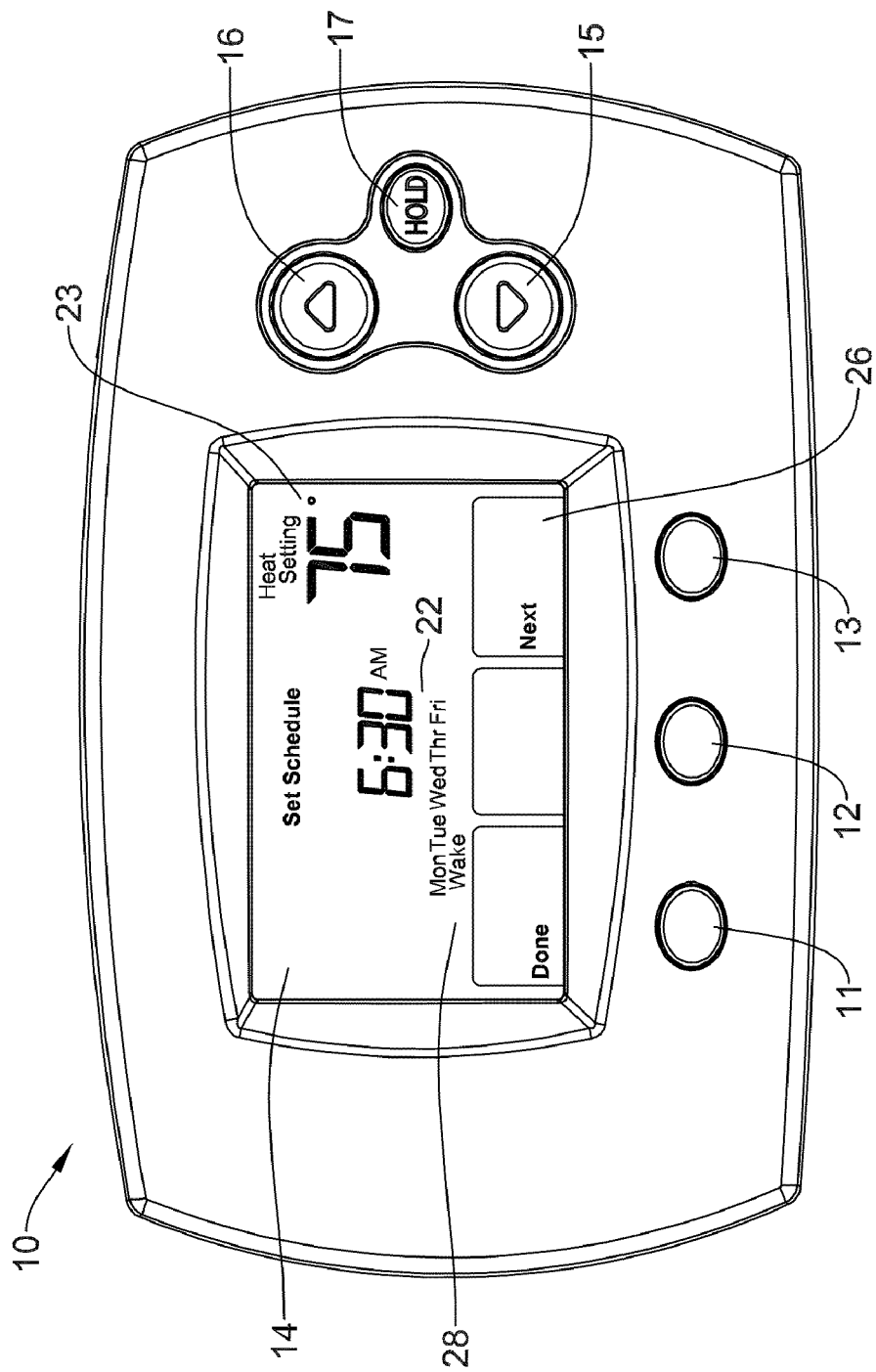
FIGS. 17-20 show settings for several periods of a weekday.
Figure 18:
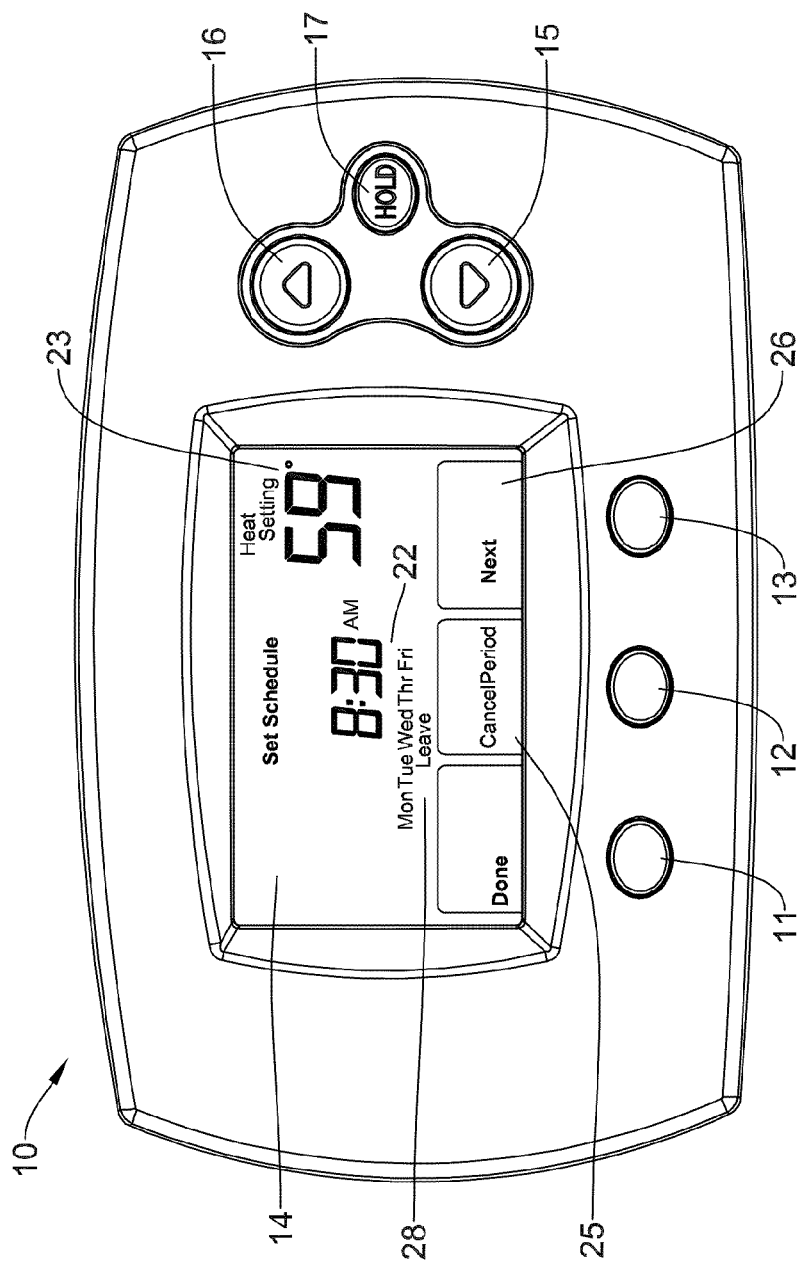
Figure 19:
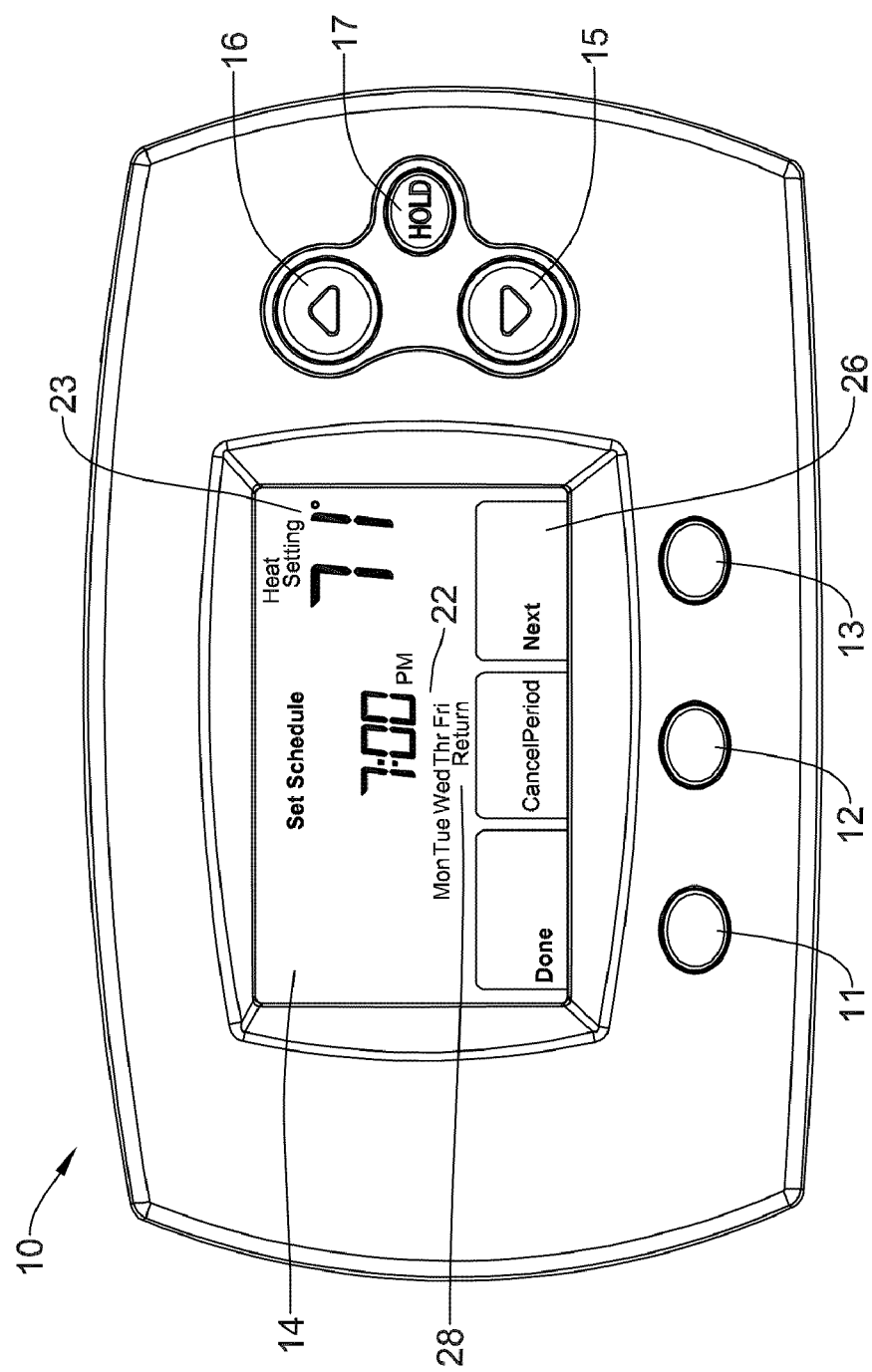
Figure 20:
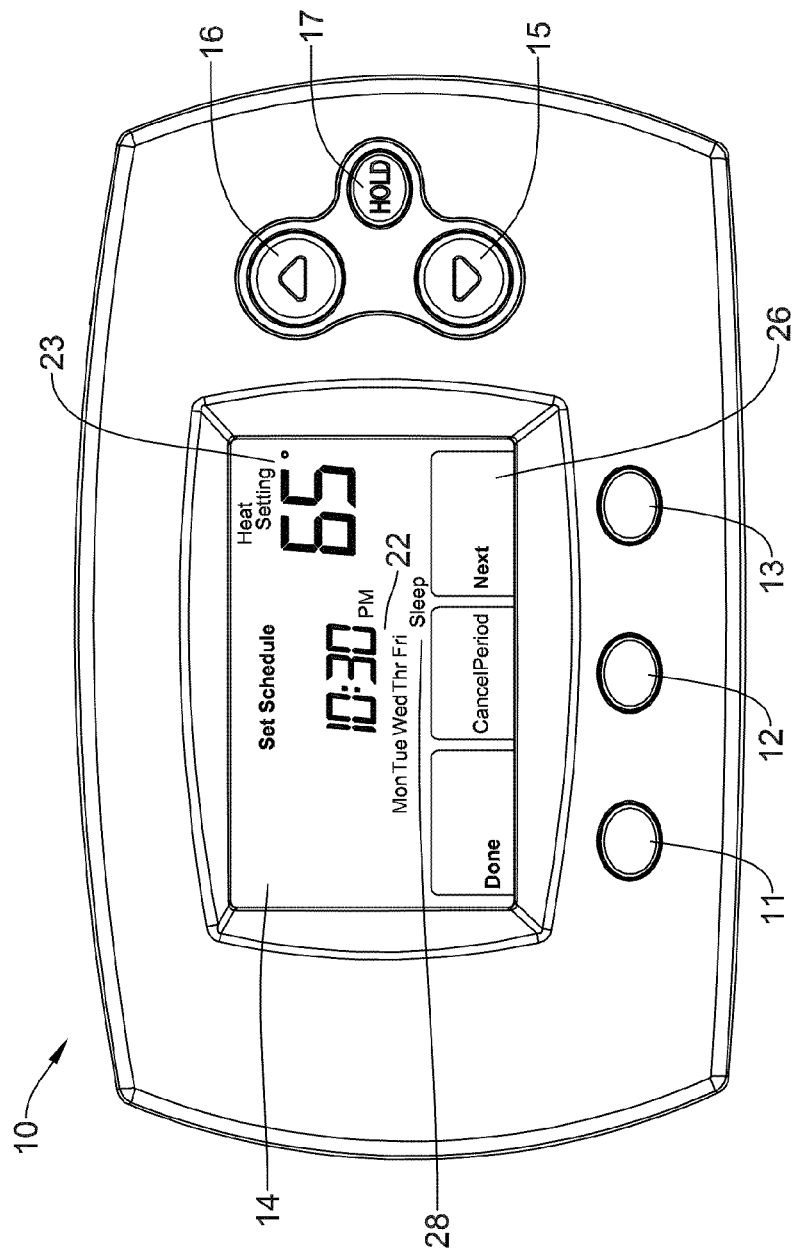

The thermostat 10 may be programmed for maximum energy savings. Four time periods 28 for each day may be programmed, with different settings for weekdays and weekends. There may be more or less than four periods. The four periods may constitute an illustrative example. The four periods 28 may be referred to as "Wake", "Leave", "Return" and "Sleep." The following example settings may be done for weekdays in the "Heat" System. For example, for the "Wake" period 28, the time 22 may be set to the time that an occupant awakens and the temperature 23 for this period 28 may be set until the occupant leaves for the day. FIG. 17 indicates that the temperature 23 may be set for 75 degrees for 6:30 A.M. To move along in the set schedule procedure, the user may press softkey or button 13 under area 26 which indicates "Next". The next period 28 may be the "Leave" period, where the occupant may set the time 22 for leaving the house and the temperature 23 that the occupant wants while away from the house. This setting may be an energy saving level. FIG. 18 indicates that the temperature 23 may be set for 59 degrees for 8:30 A.M. The user may press softkey 12 under area 25 which indicates "Cancel Period" to eliminate unwanted time periods except "Wake". The next period 28 may be the "Return" period, where the occupant returns to the house. This is where the occupant sets the thermostat 10 to the time 22 for when the occupant returns to the house, and sets the temperature 23 that the occupant wants during the evening until bedtime. FIG. 19 shows that the temperature 23 may be set at 71 degrees for the return period 28 starting at 7:00 P.M. The "Sleep" period 28 begins when the occupant goes to bed and wants a temperature 23 set for overnight. The temperature 23 setting may be an energy-saving level. FIG. 20 indicates that the temperature 23 may be set for 65 degrees beginning at 10:30 P.M.

Figure 21:
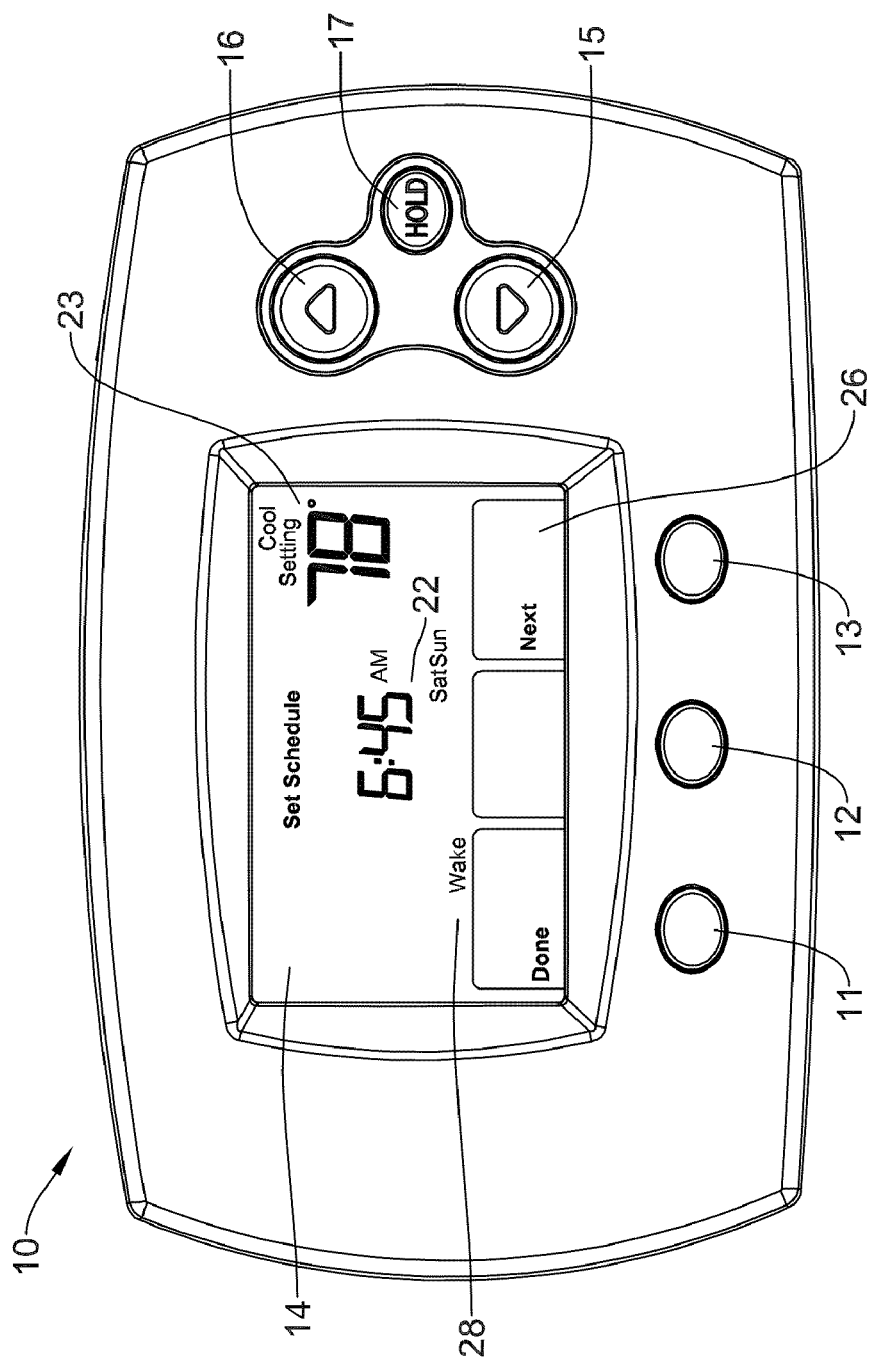
FIG. 21 shows a weekend setting.

Programmed settings may also be done for weekends. Besides the Heat settings, Cool settings 23 may also be done for each of the four periods 28, as was done with Heat settings 23. FIG. 21 is an example of a weekend Cool setting 23 of 78 degrees for a "Wake" period 28 at a time 22 of 6:45 A.M. In some versions of thermostat 10, virtually any number of and/or different periods and temperature settings may be uniquely programmed for individual days of the week, or for one or more, if not all, dates of a week, month or year.

The thermostat 10 may be pre-set to use EnergyStar® program settings for keeping heating and cooling expenses down. The "Wake" period may begin at 6:00 A.M. for weekdays and weekends. The "Heat" may be set at 70 degrees and the "Cool" may be set at 75 degrees. The "Leave" period may begin at 8:00 A.M. for weekdays and weekends. The "Heat" may be set at 62 degrees and the "Cool" at 75 degrees. The "Return" period may begin at 6:00 P.M. for weekdays and weekends. The "Heat" may be set at 70 degrees and the "Cool" at 75 degrees. The "Sleep" period may begin at 10:00 P.M. for weekdays and weekends. The "Heat" may be set at 62 degrees and the "Cool" at 78 degrees. The above-mentioned settings may apply to both weekdays and the weekend. However, one or more settings and/or periods may be canceled for the weekend. The program schedules may be adjusted in a variety of ways as indicated in the present description.

Figure 22:
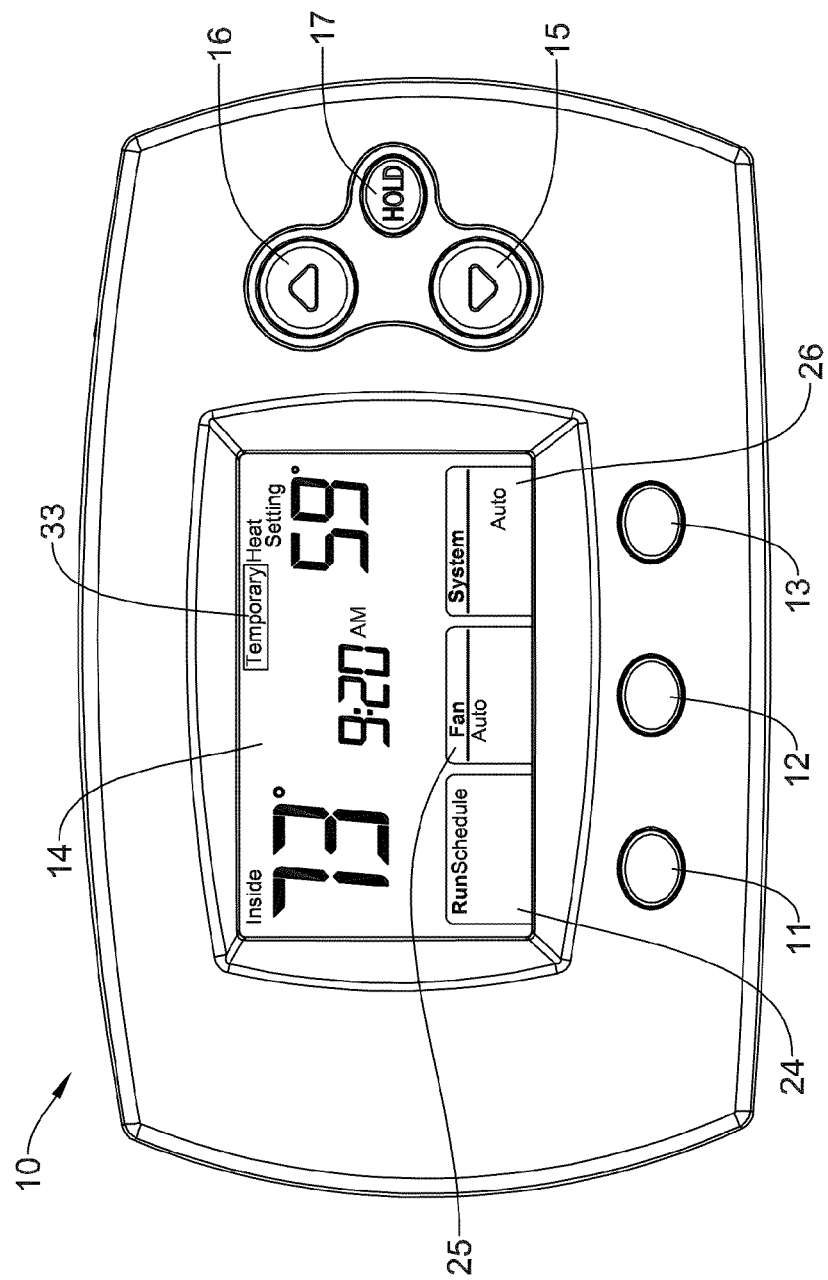
FIG. 22 shows a temporary override setting.

For one reason or another, the user may wish to do a program schedule override in a temporary fashion. To enter the override status, the user may press button 15 or 16 and hold it down for a couple seconds. Then a label 33 showing "Temporary" on the display screen may appear, as shown in FIG. 22. Then the user may adjust the temperature setting with the button 15 or 16 for a desired temperature. This temperature setting may temporarily override the temperature setting for the current time period, whether it be the "Wake," "Leave," "Return" or "Sleep" period. This new temperature may be maintained only until the next programmed time begins. For instance, if the user wants to turn the heat up during the "Wake" period, it will automatically be lowered upon the start of the "Leave" period to the previously set temperature of the latter period. The temporary setting may be cancelled at any time by pressing button 11 with "Run Schedule" showing in area 24, as shown in FIG. 22, and then the "Set Clock/Day/Schedule" label may return to area 24. When setting the thermostat 10, the occupant should assure that the thermostat selection is to the system (e.g., "Heat," "Cool" or "Auto") which is to be controlled.

Figure 23:
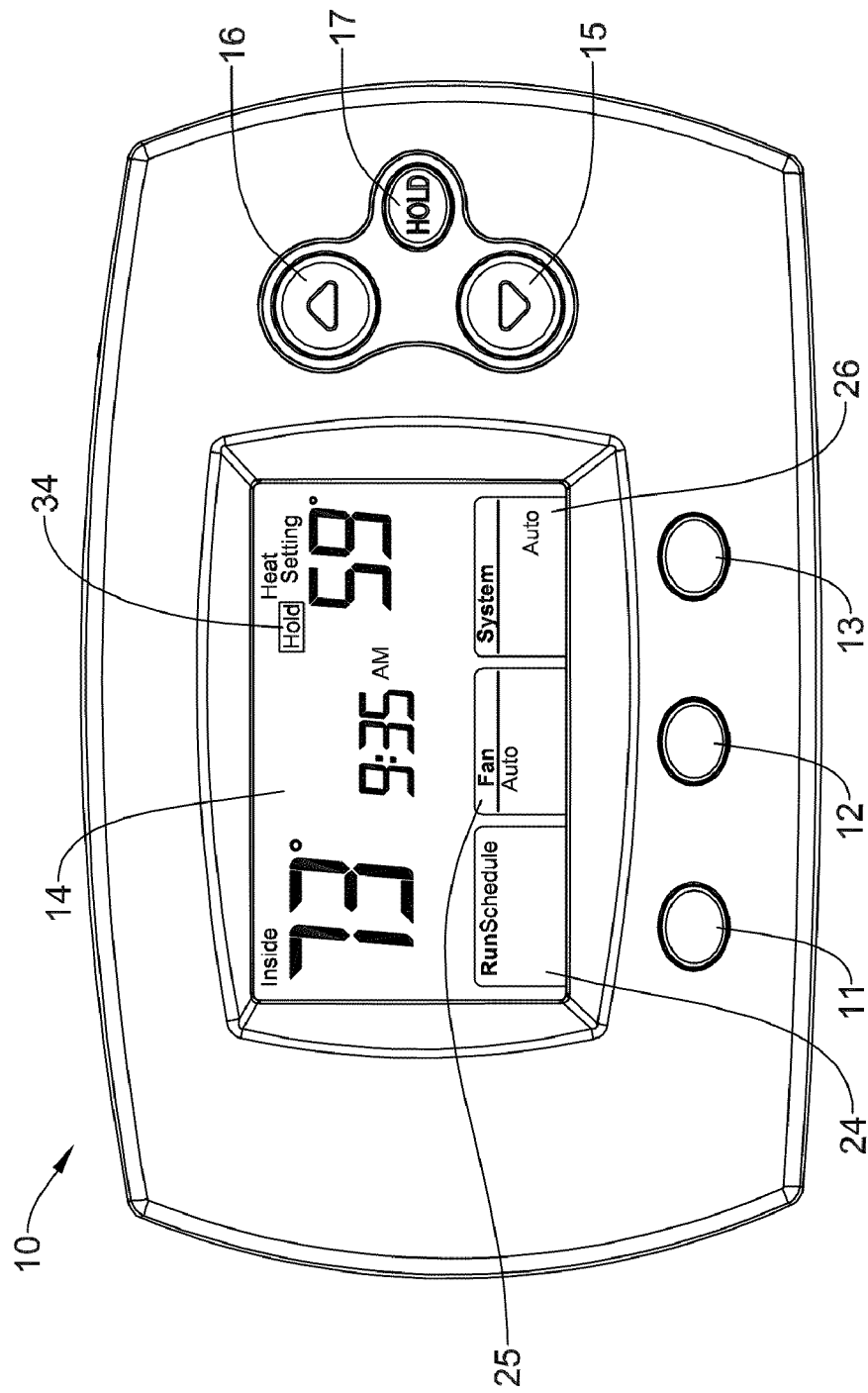
FIG. 23 shows a hold override setting.

The occupant may want to program a schedule override that is permanent. To do so, the occupant may press the "HOLD" button 17 and permanently adjust the temperature. This temperature adjustment may override the temperature settings for all time periods. To do this permanent override, the occupant would first assure that the thermostat 10 is set to the desired system (i.e., Heat, Cool, or Auto) to be controlled. The "HOLD" button 17 may turn off the program schedule and allow the occupant to adjust the thermostat manually, as desired. Whatever temperature is set will be maintained 24 hours a day, until it is manually changed. A "Hold" label 34, shown in FIG. 23, may be present on display 14 when the permanent program schedule override is in effect. To cancel the "Hold," one may go to button 11 under area 24 which says "Run Schedule" and press the button to resume the programmed schedule.

Instead of being in the "Heat" or "Cool" system, thermostat 10 may go from the MCO to the ACO (i.e., the Auto Changeover). The auto changeover may be used in climates where both air conditioning and heating are used on the same day. The system may be set to "Auto" by pressing the button 13 until "Auto" shows up in area 26 as shown in FIG. 22. When the system is set to "Auto," the thermostat 10 may automatically select heating or cooling, depending on the indoor temperature. Heating system and cooling system settings may be at a minimum at least three degrees apart. The thermostat may automatically adjust the settings to maintain the three degree separation (i.e., deadband). However, this separation could be adjusted to another value.

Thermostat 10 may have a built-in compressor protection, which may help prevent damage to the compressor in the associated air conditioning or heat pump system. Damage may occur if the compressor is restarted too soon after shutdown. The compressor may be forced to wait several minutes before restarting. During this wait time, the display 14 may flash a message label 29 "Cool On" or "Heat On" if a heat pump is associated with the system as shown in FIG. 7. When a safe wait time has elapsed, the message label 29 flashing may stop and the compressor may turn on. The location of label 29 is shown in FIG. 7.

The thermostat 10 may have an Adaptive Intelligent Recovery™ (AIR) aspect that may permit the thermostat to "learn" how long the furnace or air conditioner takes to reach the temperature setting. For instance, the user may set the program schedule to the time that the house is to reach the desired temperature. Then the thermostat 10 may turn on the heating or cooling system at an appropriate time before the scheduled time to reach the set temperature at the scheduled time. For example, the user may set the "Wake" time to 6:00 A.M., so that the temperature is at 70 degrees by 6:00 A.M. When the Adaptive Intelligent Recovery™ is in effect, the display 14 of thermostat 10 will display an "In Recovery" label 32, as shown in FIG. 7.

Figure 24:
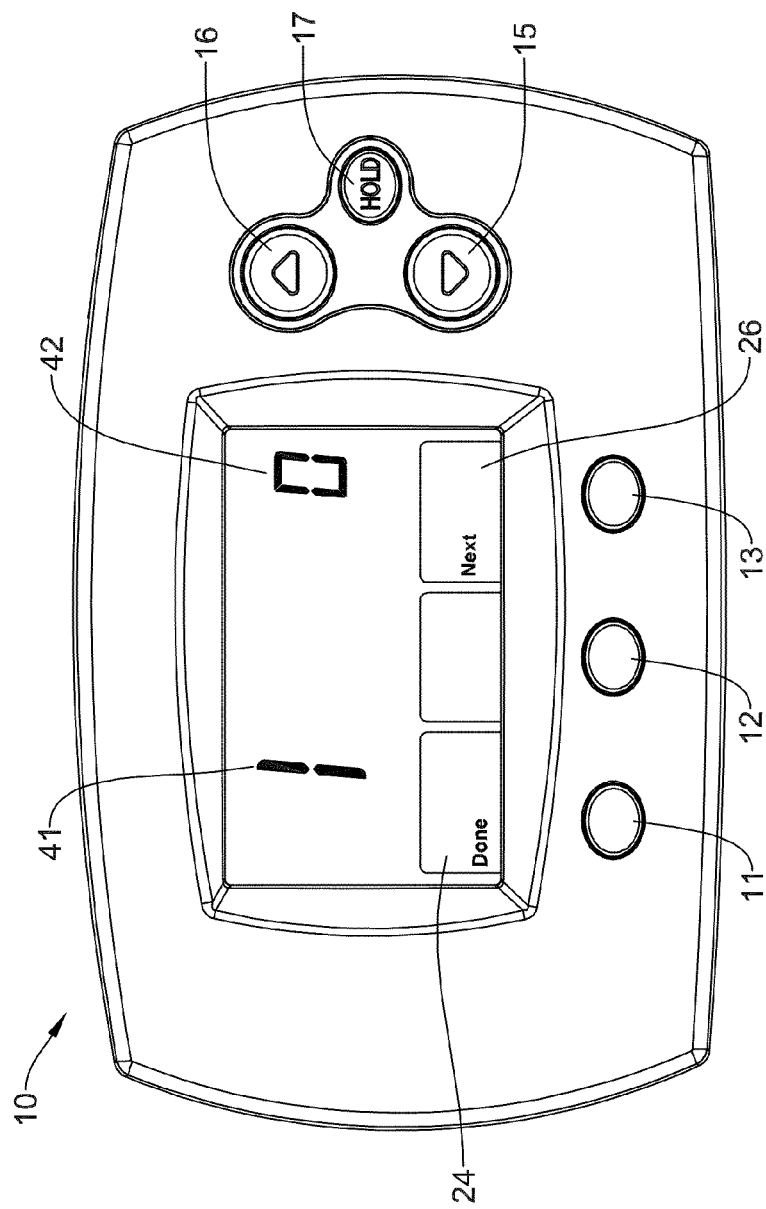
FIG. 24 reveals a system configuration selection mode.
Figure 25:
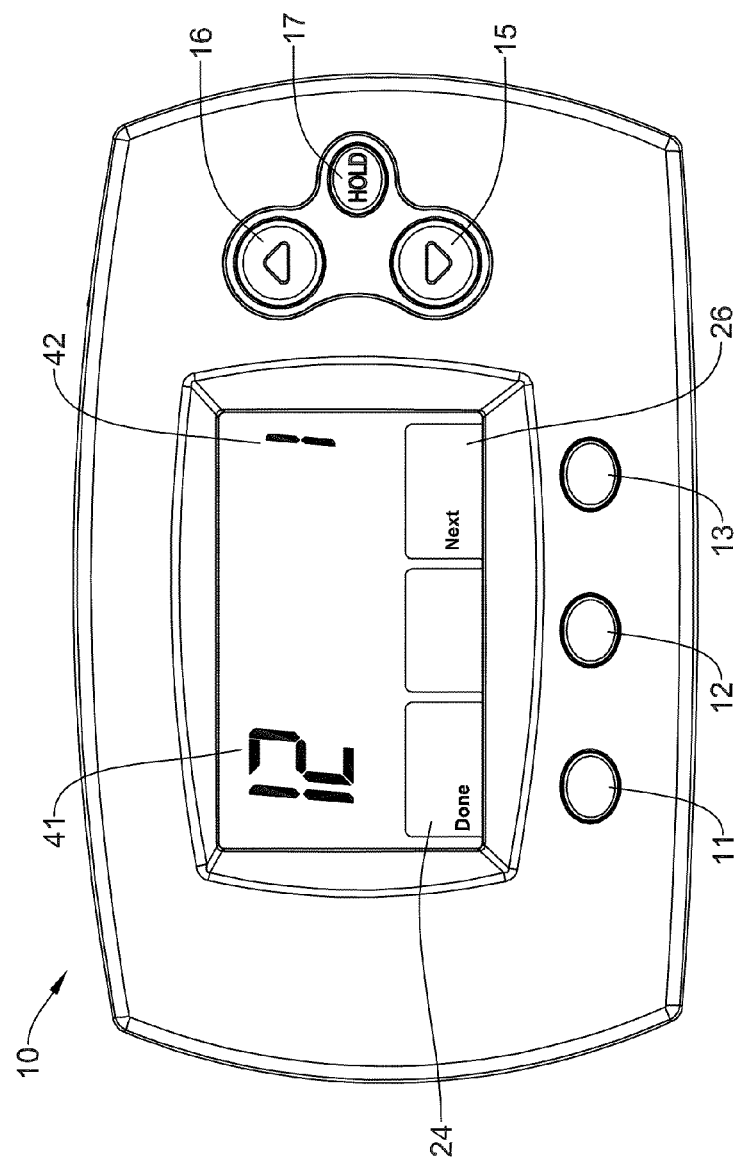
FIG. 25 reveals system options of manual changeover, auto changeover and auto changeover only.

A system configuration may be selected for the thermostat 10. Buttons 12 and 16 may be pressed together for about 4 seconds to enter the configuration mode. Numeral placeholder 41 may show a number that represents a set up category for a system that the thermostat 10 may control. Numeral placeholder 42 may show a number that represents a category option. For instance, when entering the configuration mode, a number "1" may appear in the placeholder 41, which refers to a system type, as shown in FIG. 24. A number "0" may appear in the placeholder 42, which refers to a standard heating cooling setup. The category option "0" may be a default value for the set up category "1". Set up category "1" may have other category options including "1" (heat pump), "2" (heat only), "3" (heat only with fan), "4" (cool only), "5" (two heat, one cool, heat pump), "6" (two heat, two cool, conventional), "7" (two heat, one cool, conventional), and "8" (one heat, two cool, conventional). If button 13 under area 26 with "Next" is pressed one or more times, a set up category number "12" may appear in placeholder 41, as shown in FIG. 25. Number "12" may represent an "Auto Changeover" category. The category options indicated in placeholder may include "0" (manual changeover), "1" (auto changeover), and "3" (auto changeover only). Numerous other set up categories and category options designated by other numbers in placeholders 41 and 42, respectively, may be designed into thermostat 10 as desired. The configuration mode may be exited by pressing button 11 under area 24 indicating "Done".

Figure 26:
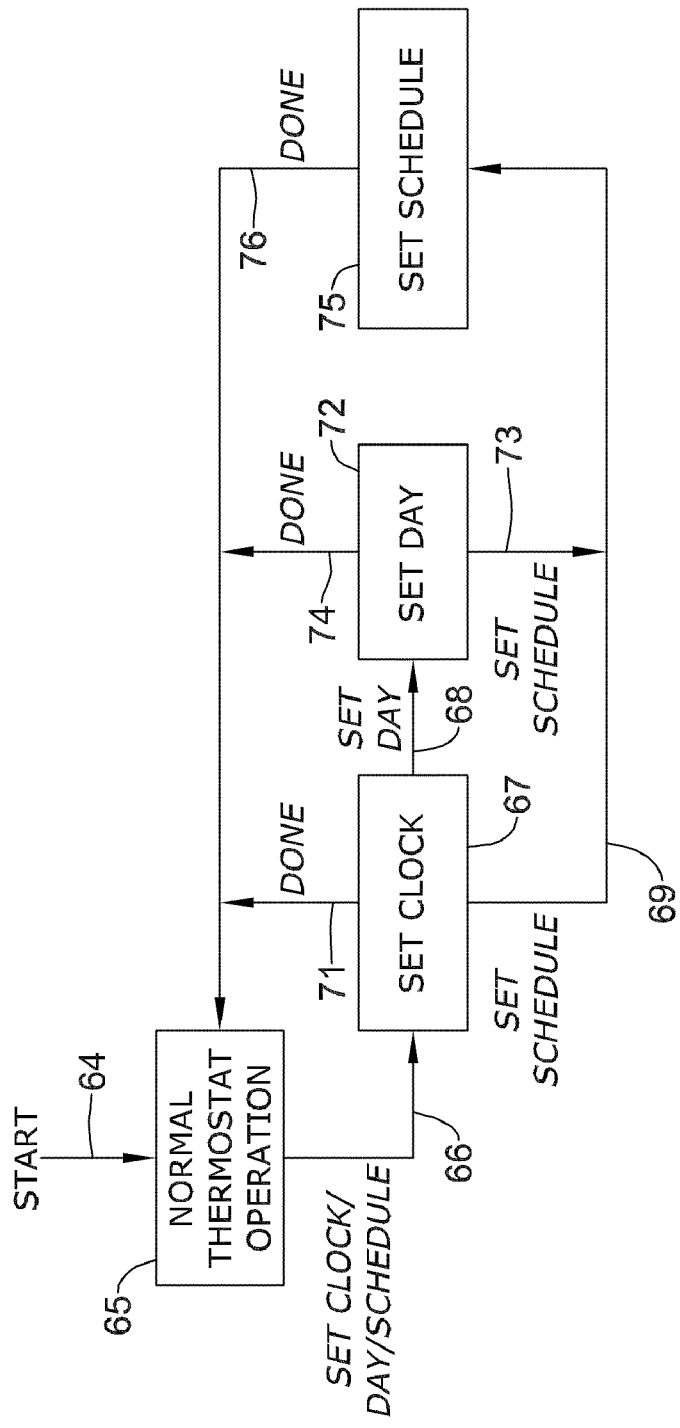
FIG. 26 is a flow diagram for setting the clock, day and schedule of the thermostat system.

FIG. 26 shows a flow diagram for setting a clock, day and schedule of the programmable thermostat. The legend for this Figure has boxes representing main informational regions and the italic text representing softkey options. A start 64 may result in a normal thermostat operation informational item 65. Pressing a softkey option proximate to a set clock/day/schedule 66 indication may lead to a set clock informational item 67. After the clock is set or checked, an option to set 68 the date, set 69 the schedule, or select done 71, may be selected with the softkey. The set day informational item 72 may be selected via option 68. Upon setting or checking the day, then an option to set 73 the schedule or select done may be effected with the softkey. The set schedule informational item 75 may be selected via option 73. Upon setting the schedule with item 75, then the done softkey option 76 may be selected.

Figure 27:
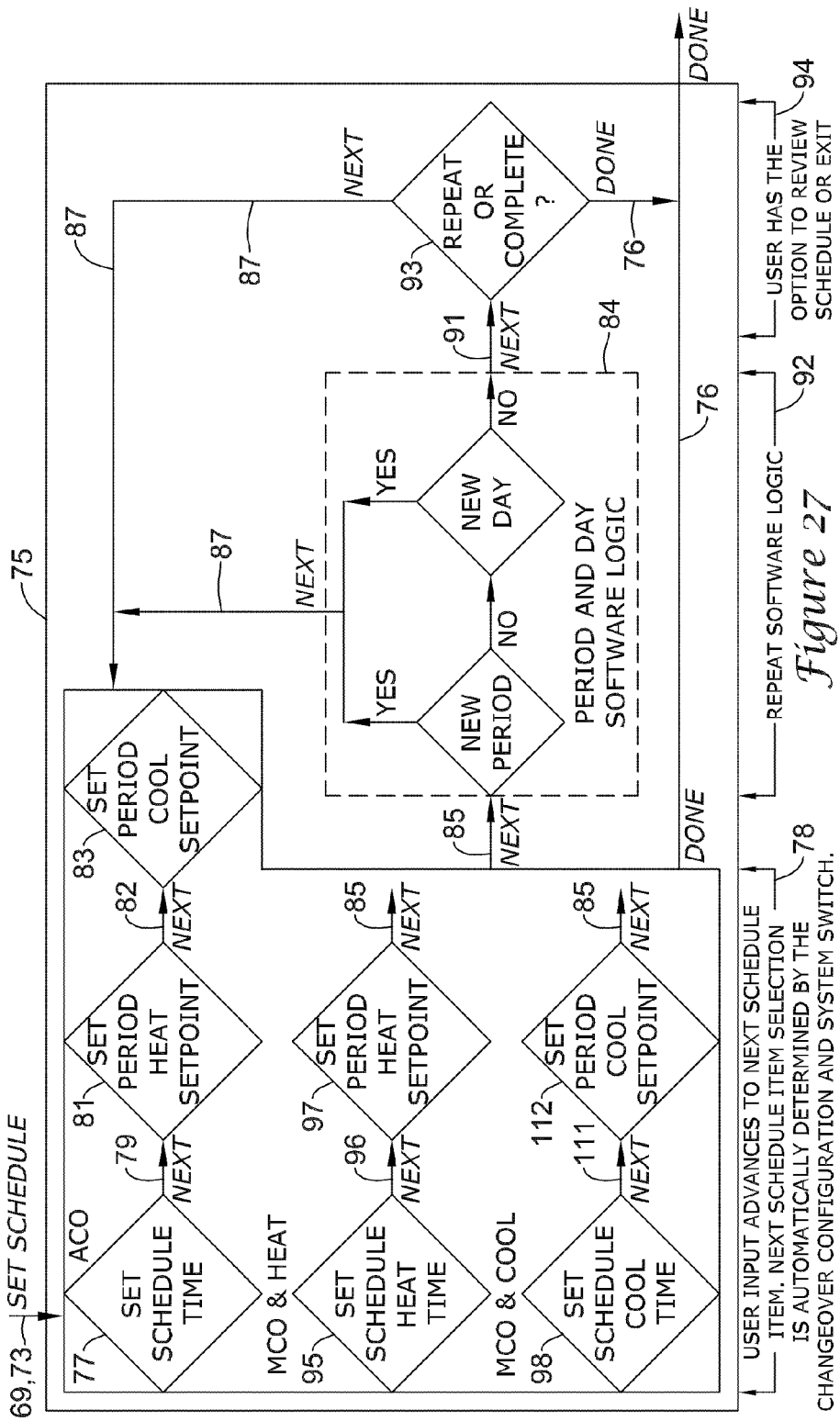
FIG. 27 is a flow diagram for the set a single schedule procedure.

The set schedule item 75 is shown in FIG. 27. Softkey options are shown in italic text and informational items in diamonds. A softkey selection 69, 73 may provide a set schedule time item 77 for the first period, depending on changeover configuration and system switch setting. Range 78 may cover the different schedule setting/viewing options. The different schedule options may be for auto changeover, manual changeover with system switch in heat, and manual changeover with system switch in cool (or off). A schedule informational item selection may automatically be determined by the changeover configuration and system switch.

The user may select the softkey next option to advance to the next informational item or select the softkey done option to exit the schedule. For the Auto changeover schedule option, upon completion of item 77, setting the period time, a user may select the done softkey option 76 or a next softkey option 79. The latter may be selected to continue the set schedule procedure. The next item 81 may be to set the period heat setpoint. Option 76 may be selected to be done or option 82 may be selected to go to the next item 83 to set the period cool setpoint. Option 76 may be selected to be done or the next item 85 may be selected to advance to item 84, period and day repeat software logic. For the manual changeover with system switch in heat schedule option, upon completion of setting the heat period time, item 95, a user may select the done softkey option 76 or a next softkey option 96. The next item 97 may be to set the period heat setpoint. Option 76 may be selected to be done or the next item 85 may be selected to advance to item 84, period and day repeat software logic. For the manual changeover with system switch in cool (or off) schedule option, upon completion of setting the cool period time, item 98, a user may select the done softkey option 76 or a next softkey option 111. The next item 112 may be to set the period cool setpoint. Option 76 may be selected to be done or the next item 85 may be selected to advance to item 84, the period and day repeat software logic. Upon completion of range 78, the done option 76 may be selected to exit the set schedule action or information item or a next option 85 may be selected which leads to the automatic new period and day software logic item 84. The period and day software logic 84 may automatically advance the user to repeat the range 78 via path 87 with a new period and/or day, or to advance to range 94. The period and day software logic 84 may repeat range 78 for each period and day of the schedule. Upon completion of the period and day software logic 84, hence having completed all periods and days, the next item 91 (same user action as item 85) may advance the user to item 93, the repeat or complete user option. Range 94 may indicate that the user has the option to review the schedule or exit. To review or repeat the schedule through range 78 and range 92, option 87 may be selected. If complete, then the done option 76 may be selected to return to the normal thermostat operation 65 of FIG. 26.

Figure 28:
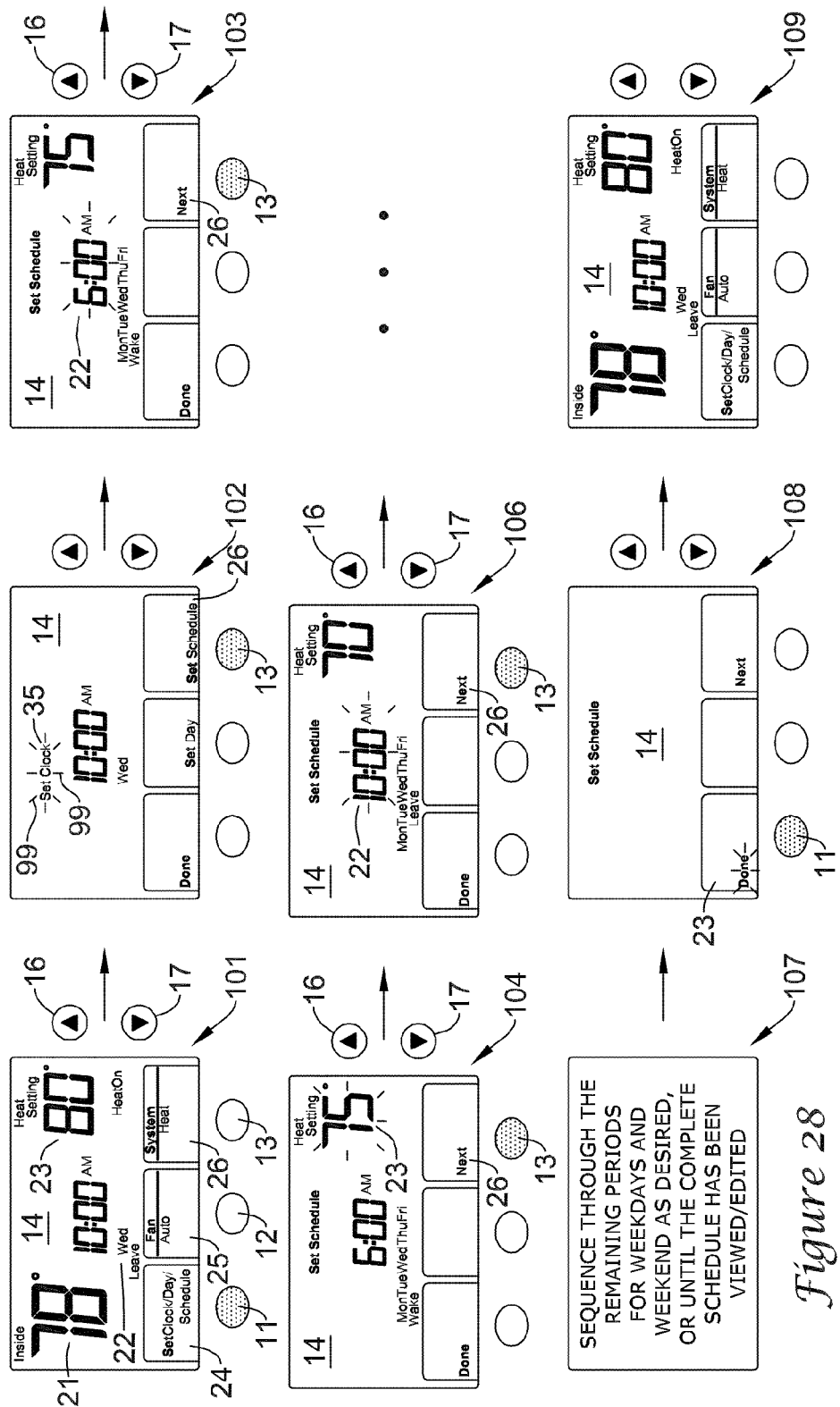
FIGS. 28, 29 and 30 are storyboard diagrams for clock and schedule settings for heat, cool and auto systems, respectively.
Figure 29:
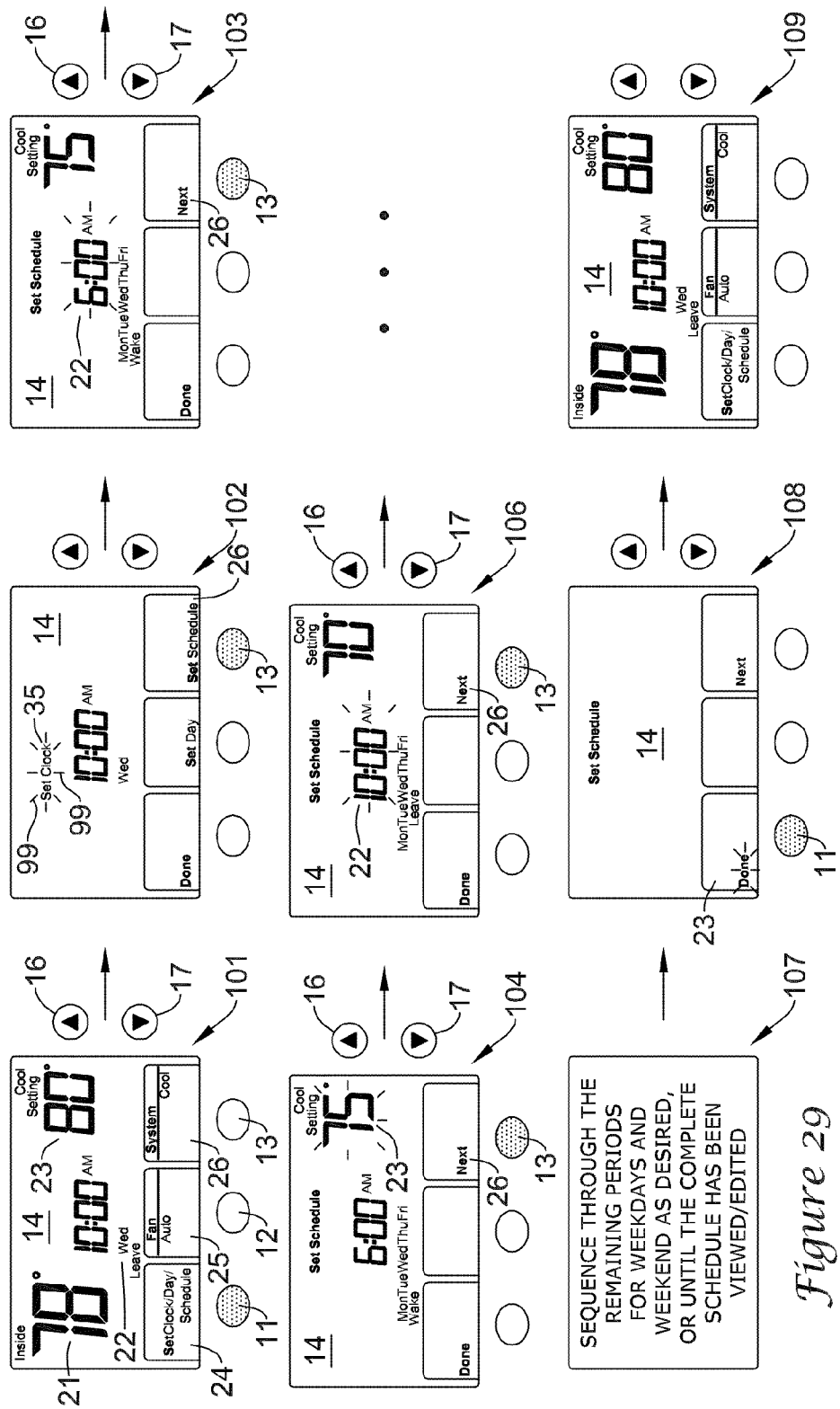
Figure 30:
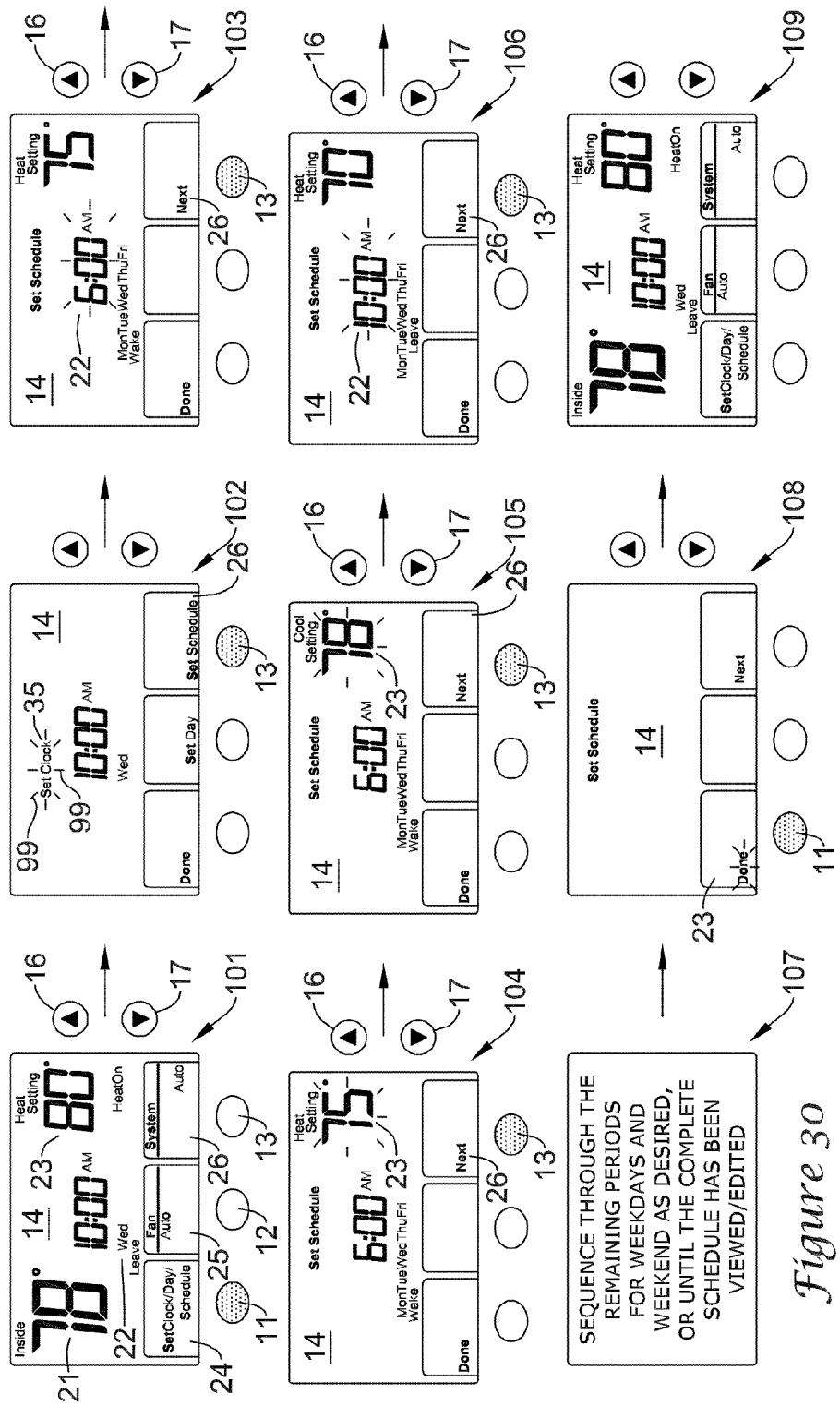

FIGS. 28, 29 and 30 are storyboard diagrams for clock and schedule settings for heat, cool and auto system settings, respectively. FIGS. 28 and 29 are clock and manual changeover schedule storyboards for heat and cool, in that order. FIG. 30 is a clock and auto changeover schedule storyboard of illustrations 101-109. In FIG. 30, system 10 is easily programmable with sequential programming having a minimally small number of steps. A user may advance an informational or action item by pressing a softkey 13 or modify a setting by pressing up/down keys 16 and 17. Illustration 101 shows a home screen 14 at normal operation. It shows the inside temperature 21, day and time 22, temperature setting 23, regions 24, 25 and 26 corresponding to softkeys 11, 12 and 13, respectively. Pressing softkey 11 under region 24 showing "Set Clock/Day/Schedule" in illustration 101 may lead to screen 14 in illustration 102, with a flashing "Set Clock" label segments 35, as depicted with short marks 99 radially extending out from the encircled label 35. These marks may indicate flashing of the segments which they are associated with also in other illustrations. Here the clock or time indication 22 may be advanced with an up (arrow) button or key 16 or backed up with a down (arrow) button or key 17.

After the clock is set, button 13 under region 26 showing "Set Schedule" may be pressed to get illustration 103 of the screen 14. It shows flashing segments (in another sense) of clock 22 with a time for a start of the Wake period. Key 16 or 17 may be pressed to set the time. Softkey 13 under region 26 that shows "Next" may be pressed to get a screen 14 as shown in illustration 104. That screen 14 may show flashing segments for a heat temperature setpoint 23. Temperature setpoint 23 may be adjusted or set by pressing key 16 or 17. After the heat temperature setpoint 23 is adjusted, softkey 13 under region 26 indicating "Next" may be pressed to get illustration 105 of a screen 14 that shows flashing segments for a cool temperature setpoint 23. The cool temperature setpoint may be adjusted or set by pressing adjustment key 16 or 17.

After the cool temperature setpoint is adjusted, softkey 13 under region 26 indicating "Next" may be pressed to get illustration 106 which shows the screen 14 with flashing segments of clock 22 with a start time for the Leave period. The time may be set with keys 16 and 17, as done for the Wake period. The temperature setpoints 23 may be similarly set. The user may sequence through the periods for weekdays and the weekend, as desired, until the complete schedule has been viewed or edited, as indicated in illustration 107. There may be four periods, Wake, Leave, Return and Sleep, as noted at other places of this description. At any point of the set schedule procedure, the user may press a softkey 11 under region 24, which indicates "Done", and return to the home screen 14 normal operation. However, if the user proceeds to complete the set schedule procedure, a screen 14 as shown in illustration 108 may appear. The screen of illustration 108 may show flashing segments of "Done" in region 24 to indicate completion of the procedure. The user may then press softkey 11 to get the screen 14 of illustration 109 showing the home screen normal operation.

When going through the period and temperature settings, as in the storyboard illustrations 101-109, one may be permitted to make both heat and cool settings if the system 10 is set in region 26 to "Heat", "Cool", "Auto" or "Off" for "auto changeover", or to "Auto" for "auto changeover only". "Auto" might be the only system selection available in region 26 for "auto changeover only". One might be permitted to make only heat settings for a system selection of "Heat", only cool settings for a system selection of "Cool", and only cool settings for a system selection of "Off" in region 26 when system 10 in manual changeover. However, thermostat system 10 may be designed and/or programmed, as desired, to consist of variants of the noted configurations, modes and settings, in this paragraph, such as editing schedules from any mode or system selection, and in other places of the present description.

A system may be designed similar to system 10 but without being programmable. However, such non-programmable thermostat system may also have a selectable "auto only" configuration that does not have a system selection of "Off". Both systems may benefit with the "auto only" aspect, in that a system cannot be switched off, for instance, accidentally by adults or by children playing with the system. This may prevent misery to a challenged person unable to switch on or control the system in exceptionally hot weather, or avoid damage to a water system of a house that is left unoccupied for a period of time in a cold climate. There are other mishaps which the "auto only" aspect of the thermostat system may avoid or prevent.

The programming, scheduling, settings, modes, configuration option selections, and the like, described herein may be performed by a user on a thermostat system 10 in an armchair.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A programmable thermostat having a programmable schedule, comprising:
    a controller;
    a display coupled to the controller;
    a first soft key coupled to the controller, the first soft key including a first button situated below but adjacent to the display, and the controller displaying a first indication in a first region of the display adjacent the first button, wherein the first indication indicates a current function of the first button;
    a second soft key coupled to the controller, the second soft key including a second button situated below but adjacent to the display, and the controller displaying a second indication in a second region of the display adjacent the second button, wherein the second indication indicates a current function of the second button;
    a third soft key coupled to the controller, the third soft key including a third button situated below but adjacent to the display, and the controller displaying a third indication in a third region of the display adjacent the third button, wherein the third indication indicates a current function of the third button;
    a first parameter adjustment button coupled to the controller, the first parameter adjustment button situated to the right of the display, the first parameter adjustment button for increasing a parameter value of the programmable thermostat;
    a second parameter adjustment button coupled to the controller, the second parameter adjustment button situated to the right of the display and below the first parameter adjustment button, the second parameter adjustment button for decreasing a parameter value of the programmable thermostat;
    the controller programmed such that one or more of the first soft key, the second soft key, the third soft key, the first parameter adjustment button and the second parameter adjustment button are used to program the programmable schedule of the programmable thermostat;
    a hold button coupled to the controller, the hold button situated to the right of the display, wherein the hold button causes the controller to override the programmable schedule of the programmable thermostat and hold a particular hold temperature set point; and
    wherein, after the hold button is actuated and causes the controller to override the programmable schedule, the controller causes the first indication in the first region of the display adjacent the first button to change from a first label to a run schedule label.

2. The programmable thermostat of claim 1 wherein, after the hold button is actuated and causes the controller to override the programmable schedule, the first button is used to cancel the schedule override and return to the programmable schedule.

3. The programmable thermostat of claim 1 wherein the first parameter adjustment button is used to increase the hold temperature set point, and the second parameter adjustment button is used to decrease the hold temperature set point.

4. A programmable thermostat having a programmable schedule, comprising:
    a controller;
    a display coupled to the controller;
    at least three buttons positioned laterally adjacent to the display, wherein each of the at least three buttons is coupled to the controller;
    the controller is programmed to display a first indication in a first region of the display adjacent a first button of the at least three buttons, wherein the first indication indicates a current function of the first button;
    the controller is programmed to display a second indication in a second region of the display adjacent a second button of the at least three buttons, wherein the second indication indicates a current function of the second button;
    the controller is programmed to display a third indication in a third region of the display adjacent a third button of the at least three buttons, wherein the third indication indicates a current function of the third button;
    at least two parameter adjustment buttons positioned adjacent to the display, wherein each of the at least two parameter adjustment buttons is coupled to the controller, and wherein the at least two parameter adjustment buttons are used to adjust parameter values of the programmable thermostat;
    the controller programmed such that the at least three buttons and the at least two parameter adjustment buttons are used to program the programmable schedule of the programmable thermostat;
    a hold button positioned adjacent to the display, wherein the hold button is coupled to the controller, and wherein the hold button causes the controller to at least temporarily override the programmable schedule of the programmable thermostat and hold a particular hold temperature set point for at least a period of time; and
    wherein, after the hold button causes the controller to override the programmable schedule, the controller causes the first indication in the first region of the display adjacent the first button to signify a run schedule function.

5. The programmable thermostat of claim 4 wherein the controller does not display an indication on the display adjacent each of the at least two parameter adjustment buttons that describes a current function of each of the at least two parameter adjustment buttons.

6. The programmable thermostat of claim 4 wherein the at least three buttons are positioned below the display.

7. The programmable thermostat of claim 6 wherein the at least two parameter adjustment buttons are positioned to the side of the display.

8. The programmable thermostat of claim 7 wherein the at least two parameter adjustment buttons are positioned to the right of the display.

9. The programmable thermostat of claim 8 wherein the hold button is positioned to the right of the display adjacent the at least two parameter adjustment buttons.

10. The programmable thermostat of claim 4 wherein the hold button causes the controller to override the programmable schedule of the programmable thermostat and hold the particular hold temperature set point until the schedule override is canceled.

11. The programmable thermostat of claim 10 wherein the at least two parameter adjustment buttons can be used to adjust the particular hold temperature set point.

12. The programmable thermostat of claim 4 wherein the hold button causes the controller to override the programmable schedule of the programmable thermostat and hold the particular hold temperature set point until the first button is activated to cancel the schedule override.

13. A method for operating a programmable thermostat having a programmable schedule, comprising:
displaying a first indication in a first region of a display adjacent a first button, wherein the first indication indicates a current function of the first button, wherein the first button is situated adjacent to the first region of the display;
displaying a second indication in a second region of the display adjacent a second button, wherein the second indication indicates a current function of the second button, wherein the second button is situated adjacent to the second region of the display;
activating a hold button, wherein the hold button is situated adjacent to the display, and wherein the hold button causes the programmable schedule of the programmable thermostat to be overridden and to hold a particular hold temperature set point; and
after the hold button is activated, changing the first indication in the first region of the display from a first label to a second label.

14. The method of claim 13, wherein the second label signifies a run schedule function.

15. The method of claim 14 wherein, after activating the hold button, which causes the controller to override the programmable schedule, activating the second button to cancel the schedule override and return the programmable thermostat to the programmable schedule.

16. The method of claim 13 further comprising:
activating a first parameter adjustment button, which is situated adjacent to the display, to increase the hold temperature set point.

17. The method of claim 13 further comprising:
activating a second parameter adjustment button, which is situated adjacent to the display, to decrease the hold temperature set point.

* * * * *